United States Patent
Rahman et al.

(10) Patent No.: US 10,558,623 B2
(45) Date of Patent: Feb. 11, 2020

(54) SEARCH ENGINE OPTIMIZATION FOR RESOURCE DIRECTORY

(71) Applicant: CONVIDA WIRELESS, LLC, Wilmington, DE (US)

(72) Inventors: Shamim Akbar Rahman, Cote St. Luc (CA); Dale N. Seed, Allentown, PA (US); Chonggang Wang, Princeton, NJ (US); Quang Ly, North Wales, PA (US)

(73) Assignee: Convida Wireless, LLC, Wilmington, DE (US)

( * ) Notice: Subject to any disclaimer, the term of this patent is extended or adjusted under 35 U.S.C. 154(b) by 294 days.

(21) Appl. No.: 15/307,115

(22) PCT Filed: Apr. 28, 2015

(86) PCT No.: PCT/US2015/027943
§ 371 (c)(1),
(2) Date: Oct. 27, 2016

(87) PCT Pub. No.: WO2015/168091
PCT Pub. Date: Nov. 5, 2015

(65) Prior Publication Data
US 2017/0046366 A1    Feb. 16, 2017

Related U.S. Application Data

(60) Provisional application No. 61/985,254, filed on Apr. 28, 2014.

(51) Int. Cl.
*G06F 16/21* (2019.01)
*G06F 16/951* (2019.01)
(Continued)

(52) U.S. Cl.
CPC ...... *G06F 16/211* (2019.01); *G06F 16/24578* (2019.01); *G06F 16/951* (2019.01);
(Continued)

(58) Field of Classification Search
CPC ........... G06F 17/30292; G06F 17/3053; G06F 17/30864; G06F 17/30867;
(Continued)

(56) References Cited

U.S. PATENT DOCUMENTS 6,826,624 B1   11/2004   Fell, Jr.
7,028,029 B2   4/2006   Kamvar et al.
(Continued)

FOREIGN PATENT DOCUMENTS

| CN | 101449271 A | 6/2009 |
| EP | 2 131 292 A1 | 6/2008 |
| JP | 2009-301546 | 12/2009 |

OTHER PUBLICATIONS

Shelby et al., CoRE Resource Directory; draft-ietf-core-resource-directory-00.txt; CoRE Resource Directory; Internet Engineering Task Force, I ETF; Standardworkingdraft, Internet Society (ISOC) 4, Rue Des Fala I Ses CH-1205 Geneva, Switzerland, Jun. 3, 2013 (Jun. 3, 2013), pp. 1-27, XP015090761; (Year: 2013).*

(Continued)

*Primary Examiner* — Evan Aspinwall
(74) *Attorney, Agent, or Firm* — BakerHostetler

(57) ABSTRACT

An evolved resource directory may provide filtered and prioritized search results to a client's search query for resources. For example, in a network comprising servers and a resource directory, the resource directory registers a plurality of URIs received from the servers. The resource directory may determine an initial ranking of the plurality of URIs based on measuring cross-links between each of the plurality of URIs and identifying contexts of the plurality of URIs. The initial ranking is stored in a ranked database. In response to a client's search query, the resource directory may determine a real-time ranking for the plurality of URIs stored in the ranked database. The real-time ranking may be determined based on checking a sleep status for each of the (Continued)

servers and/or by partially balancing traffic loads of the servers. The resource directory, based on the real-time ranking and/or the initial ranking, may then generate a ranked list of the filtered and prioritized URIs.

19 Claims, 21 Drawing Sheets

(51) Int. Cl.
*G06F 16/9535* (2019.01)
*G06F 16/955* (2019.01)
*G06F 16/2457* (2019.01)
*H04W 4/70* (2018.01)

(52) U.S. Cl.
CPC ...... *G06F 16/9535* (2019.01); *G06F 16/9558* (2019.01); *G06F 16/9566* (2019.01); *H04W 4/70* (2018.02)

(58) Field of Classification Search
CPC ......... G06F 17/30882; G06F 17/30887; G06F 16/211; G06F 16/9558; G06F 16/9566; G06F 16/9535; G06F 16/24578; G06F 16/951; H04W 4/70
USPC ........................................................ 707/803
See application file for complete search history.

(56) References Cited

U.S. PATENT DOCUMENTS

| | | | |
|---|---|---|---|
| 7,058,628 B1* | 6/2006 | Page | G06F 17/30728 |
| 7,475,069 B2 | 1/2009 | Blackman et al. | |
| 9,071,572 B2 | 6/2015 | Ukkola et al. | |
| 2009/0254643 A1 | 10/2009 | Terheggen et al. | |
| 2013/0212215 A1* | 8/2013 | Ukkola | H04L 67/02 709/217 |
| 2014/0215043 A1* | 7/2014 | Ryu | H04W 4/70 709/223 |
| 2016/0006815 A1* | 1/2016 | Dong | G06F 9/46 709/204 |

OTHER PUBLICATIONS

Japanese Patent Application No. 2016-565010: Notice of Reasons for Rejection dated Oct. 11, 2017, 4 pages.
Shelby et al, "CoRE Resource Directory Draft-ietf-Core-Resource-Directory-00", Internet-Draft, Internet Engineering Task force, IETF, Jun. 3, 2013, 28 pages.
International Patent Application No. PCT/US2015/027943: International Search Report and the Written Opinion dated Jul. 13, 2015, 10 pages.
www.en.Wikipedia.org/Search_Engine_Optimization, Jun. 6, 2017, 8 pages.
www.en.wikipedia.org/wiki/Web_Crawler, Jun. 1, 2017, 11 pages.
Shelby et al, "CoRE Resource Directory draft-ietf-Core-Resource-Directory-01", Internet-Draft, Dec. 11, 2013, 8 pages.
Shelby, Z., "Constrained RESTful Environments (CoRE) Link Format", Internet Engineering Task Force (IETF), RFC 6690, Aug. 2012, 22 pages.
Rahman, A, "Enhanced Sleepy Node Support for CoAP draft-rahman-core-sleepy-05", CORE WG Internet-Draft, Standards Track, Feb. 12, 2014, 15 pages.
Rahman et al, "Group Communication for CoAP draft-ietf-core-groupcomm-13", CoRE Working Group, Internet-Draft, Sep. 19, 2013, 38 pages.
Fossati, T., "A Link-Format Attribute for Locating Things draft-fossati-core-geo-link-format-attribute-03", Internet Engineering Task Force, Internet-Draft, Feb. 12, 2014, 6 pages.
Shelby et al, "Constrained Application Protocol (CoAP) draft-ietf-core-coap-18", CoRE Working Group, Internet-Draft, Jun. 28, 2013, 118 pages.
Castellani et al, "Guidelines for HTTP-CoAP Mapping Implementations draft-ietf-core-http-mapping-03", CoRE Working Group, Internet-Draft, Feb. 12, 2014, 25 pages.
Fielding et al, "Hypertext Transfer Protocol—HTTP/1.1", Network Working Group, RFC 2616, Jun. 1999, 114 pages.
www.en.wikipedia.org/wiki/Representational_State_Transfer, May 31, 2017, 6 pages.
Berners-Lee et al, "Uniform Resource Identifier (URI): Generic Syntax", Network Working Group, RFC 3986, Jan. 2005, 61 pages.
Nottingham, C., "Web Linking", Internet Engineering Task Force (IETF), RFC 5988, Oct. 2010, 23 pages.
OneM2M TS-0001 V0.4.2, "oneM2M Functional Architecture Baseline Draft", Mar. 2014, 302 pages.
www.en.Wikipedia.org/Load balancing (computing), Sep. 9, 2013, 8 pages.

\* cited by examiner

SEARCH ENGINE OPTIMIZATION FOR RESOURCE DIRECTORY

CROSS-REFERENCE TO RELATED APPLICATIONS

This application is the National Stage of International Patent Application No. PCT/US2015/027943, filed Apr. 28, 2015, which claims the benefit of U.S. Provisional Application No. 61/985,254, filed Apr. 28, 2014, the disclosures of which are incorporated herein by reference in their entireties.

BACKGROUND

Search engine optimization is a popular method currently used in the "regular" (i.e. non-IoT) Internet to influence web search engine results. From experience, it has been found that, in the majority of cases, a human user will select only from the first few returned uniform resource identifiers (hereinafter referred to as URIs) from a web search even though the total number of returned URIs may be in the order of hundreds or thousands of URIs (e.g. many pages of Google search results). That is, only the first few URIs at the top of the first returned web search result page are typically selected by the user, all the other URIs are typically ignored and never clicked on.

For regular Internet searches, the returned URIs are HTTP based. Technically, this means that the first part (i.e. scheme) of the URI specifies "http(s)". For example, "http://www-.bestcars.com" or "https://mybank.com" are examples of HTTP URIs.

The fact that a human user will typically focus only on the first few returned URIs from a web search is both a cause and effect of search engine optimization. That is, human users have become conditioned to the fact that modern search engines are implicitly putting the best search results at the top of the returned list of URIs. Search engine optimization refers to a set of techniques used by website developers to help ensure that search engines rank their websites relatively higher.

FIG. 1 illustrates a popular search engine optimization technique that is often referred to as cross-linking or sometimes as inbound linking. This cross-linking technique is to ensure that a given website is pointed to from other websites. Websites that have a lot of cross-links pointing to them are ranked higher by search engines as cross-linking is considered a strong measure of the popularity of the website. The cross-linking is detected by web crawlers that a search engine regularly sends out to crawl and map the World Wide Web.

Another popular search engine optimization technique is to ensure that the website content uses selected key words. This is because search engines use the frequency and distribution of certain key words in a web page as part of the input into their ranking algorithms. Again these key words are detected by search engine web crawlers.

The current IoT model for supporting Internet resource searches is very simple and does not support any advanced search-engine-optimization-like concepts. In the current IoT, the key search node is the resource directory that stores URIs pointing to IoT resources. These URIs are pushed directly into the resource directory by IoT servers instead of being discovered by web crawlers as typically done in the regular Internet search engines. The resource directory is then used as a search engine by clients who are looking for a particular IoT resource. The search can be tailored via input parameters from the client as disclosed in, for example, an internet draft of CoRE Resource Directory updated on Dec. 11, 2013 (http://tools.ietf.org/html/draft-ietf-core-resource-directory-01). However, for a given client's search request, the returned list of URIs is flat, unfiltered and potentially very large.

The URIs for IoT may be either HTTP based as per the regular Internet, or may often be Constrained Application Protocol (hereinafter referred to as CoAP) based. CoAP, as disclosed in, for example, an internet draft of Constrained Application Protocol updated on Jun. 6, 2013 (http://tools.ietf.org/html/draft-ietf-core-coap-18), is an optimized web transfer protocol specifically designed for constrained devices but otherwise follows the Representational State Transfer (hereinafter referred to as RESTful) approach of HTTP. RESTful refers to a stateless, request/response model of communication for web transfer protocols.

Similar to the HTTP approach, CoAP URIs can be identified if the first part (i.e. scheme) of the URI specifies "coap(s)". For example, "coap://tempsensor.floor2.bldg6" or "coaps://securitycamera.home" are examples of CoAP URIs. Also, for IoT, the description of URIs and their attributes and relationships is defined in RFC6690 "Constrained RESTful Environments Link Format" (http://tools.ietf.org/html/rfc6690) and is referred to as "CORE Link Format".

The following detailed use case illustrates how the current resource directory works and some of its drawbacks. It is assumed that a large factory has 1000 temperature sensors distributed through the building. FIG. 2 illustrates temperature sensors 202, 204, and 206 registering their URIs with a resource directory. As shown in FIG. 2, each sensor 202, 204, or 206 will at start up register (via CoAP Post) their resource (URI) with the local resource directory 208. This will allow the resource directory to build up a database of URIs. In practice, the resource directory is generally localized in scope. For example, a large city may have several resource directories. However, in theory nothing prevents a resource directory 208 from being global in scope. The scope of the resource directory is completely an implementation and deployment choice.

FIG. 3 illustrates an example in which a client 302 queries a resource directory for a list of temperature sensors. After the temperature sensors 202, 204, and 206 register their URIs with the resource directory, a client sends a search query (via CoAP GET) as shown in FIG. 3. The search query requests the resource directory to identify which URIs will provide a temperature reading in the domain of the factory. This is specified through the search parameters which are part of the query.

FIG. 4 illustrates in the same example how a resource directory 208 returns an unfiltered list of temperature sensors in response to the client search query. The resource directory responds (via CoAP GET response) with the complete list of the 1000 temperature sensor URIs that it had registered in its database.

The client's challenge in this current IoT model is illustrated in FIG. 5. From a list of 1000 temperature sensors returned in response to the client's query, which of the 1000 URIs should the client attempt to access? The underlying assumption is that it is not practical for the client 302 to access all 1000 URIs because of constraints in either time, bandwidth, processing power, etc.

As additional background information, oneM2M, as disclosed in, for example, "oneM2M Functional Architecture" oneM2M-TS-0001 oneM2M Functional Architecture-V-0.42, aims to specify a common service layer that can be readily embedded within various hardware and software to support different M2M applications such as connected cars, smart health, etc. The oneM2M as a common service layer basically defines a set of Common Service Functions, for example, Discovery Common Service Function. An instantiation of a set of one or more particular types of Common Service Functions is referred to as a Common Services Entity. A Common Service Entity can be hosted on different types of network nodes such as an infrastructure node, middle node, or application-specific node.

FIG. 6 illustrates the oneM2M functional architecture 600 where: 1) an Application Entity (AE) 602 can access and leverage Common Service Functions in an Common Service Entity (CSE) 604 via Mca interface; 2) an Common Service Entity 604 can communicate with another Common Service Entity 606 via Mcc interface; and 3) an Common Service Entity 604 can also leverage Network Service Entity (NSE) 608 from underlying networks via Mcn interface. For example, an M2M Server as a Common Service Entity has Discovery Common Service Function, which can be leveraged by an Application Entity to search resources maintained in the M2M Server or even in other places which the M2M Server has access to.

SUMMARY

The techniques used for advanced search engine optimization in the regular Internet cannot be used directly for IoT or M2M for several reasons. First, many of the search engine optimization techniques are based on the model of a powerful search engine such as Google. In this model, the search engine sends out web crawlers across the entire world wide web to detect website properties, for example, cross-links, key words, etc. However, the IoT or M2M model is radically different in that while there is a resource directory which stores URIs, these URIs are pushed directly into the resource directory by servers. In addition, the resource directory does not send out any type of web crawlers to determine properties of the web space. In the IoT or M2M model, a resource directory is used as a search engine by clients who are looking for a particular resource, URI.

Secondly, in the majority of IoT or M2M cases, no human is involved in the IoT or M2M search. Unlike the web searches in the regular Internet, in an IoT or M2M search, humans cannot make cognitive decisions on which URI to select from a search result with a large number of returned URIs. Instead, in an IoT or M2M search, the search results are typically returned to a constrained device with limited decision making and limited processing ability. Finally, regular Internet websites are assumed to be always available. However, in IoT or M2M, many servers may frequently go into sleep mode and thus not always be available. This characteristic is currently not considered in regular Internet web search results.

Therefore, there is a need for adding more advanced search engine optimization to the current resource directory functionality that will provide IoT or M2M devices with the most efficient search results. This advanced search engine optimization may allow the resource directory to provide the client with an optimized search result to select the best URI(s).

Described herein are methods, devices, and systems for providing search engine optimization for a resource directory in a network comprising servers and a resource directory. In an example embodiment, the resource directory registers uniform resource identifiers received from the servers. The resource directory may determine an initial ranking of the uniform resource identifiers based on measuring cross-links between each of the uniform resource identifiers. The more a uniform resource identifier is cross-linked to another, the higher the uniform resource identifier is ranked. The resource directory may also determine the initial ranking based on identifying contexts of the uniform resource identifiers. The contexts of the uniform resource identifiers may comprise a resource type, a domain, a geographical location, a multicast, and a unicast. The resource directory may select a group of uniform resource identifiers based on the contexts, such as the same resource type, and rank the group higher than an unselected group of the uniform resource identifiers. Upon determining the initial ranking, the resource directory may generate a ranked database storing the initial ranking.

In response to a search query received from a client, the resource directory may determine a real-time ranking for the uniform resource identifiers that are stored in the ranked database. The real-time ranking may be determined by checking a sleep status for each of the servers. For example, if a uniform resource identifier is sleeping at the time of search, the sleeping uniform resource identifier is ranked lower than another uniform resource identifier that is awake or the sleeping uniform resource identifier is removed entirely from the search results. The real-time ranking may also be determined based on partially balancing traffic loads of the servers. The uniform resource identifier that has been ranked higher many times or has been detected as having higher traffic flow may be ranked lower than other uniform resource identifiers. Upon determining the real-time ranking, the resource directory may generate a ranked list of the filtered and prioritized uniform resource identifiers and return that ranked list to the client.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Figure 1:
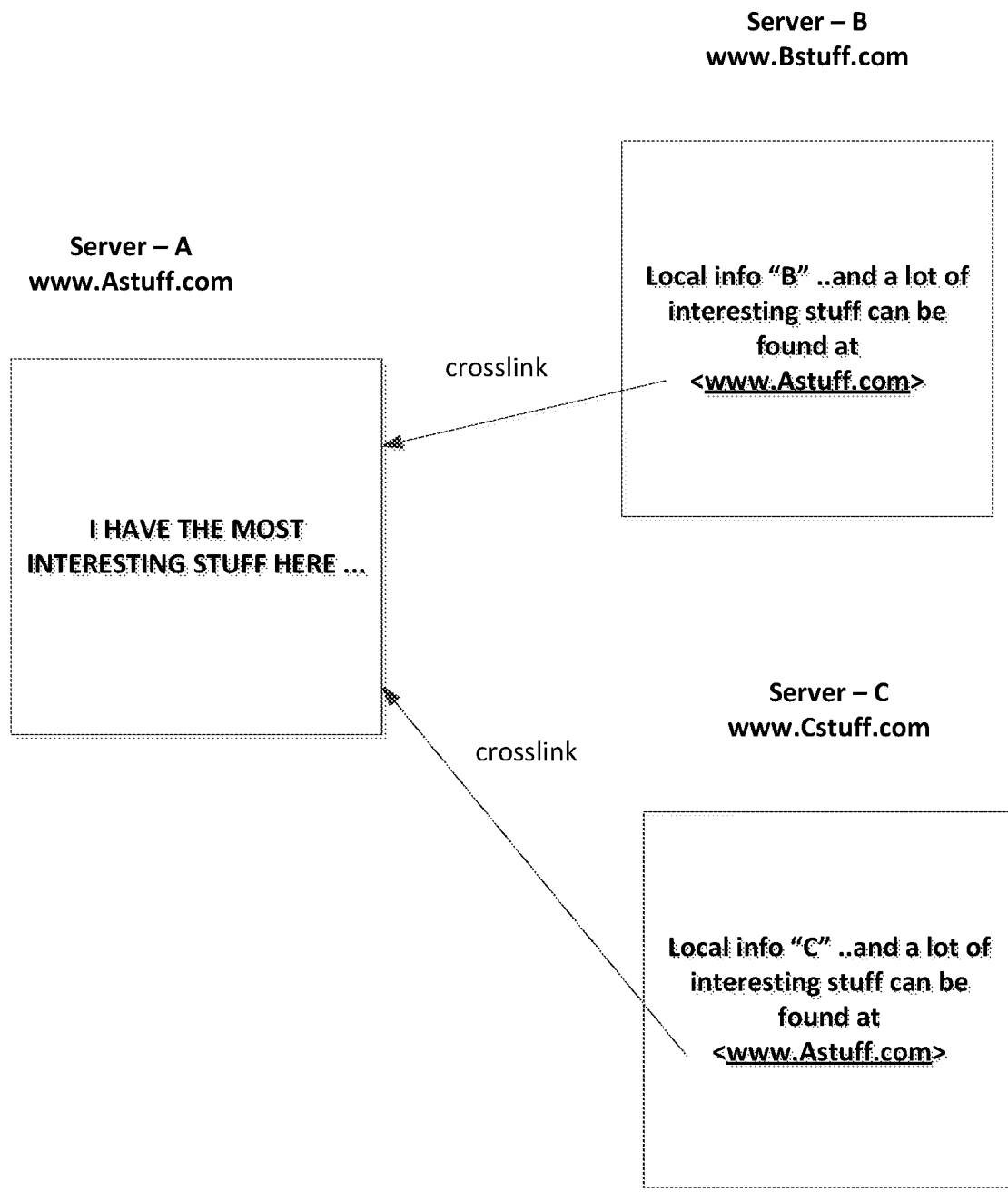
FIG. 1 is a system diagram illustrating an example of cross linking to server-A in the regular (non-IoT) Internet.
Figure 2:
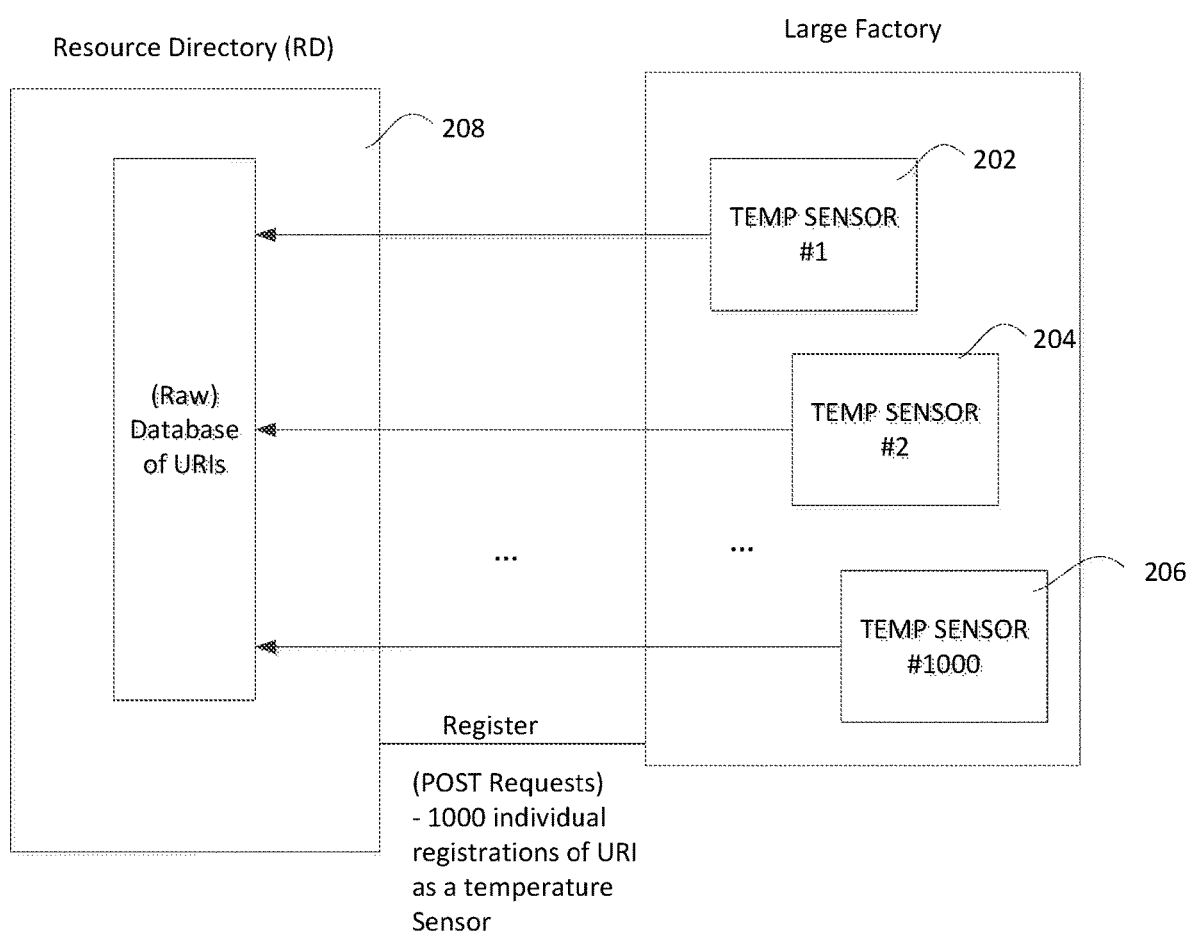
FIG. 2 is a system diagram illustrating temperature sensors registering their uniform resource identifiers with a resource directory.
Figure 3:
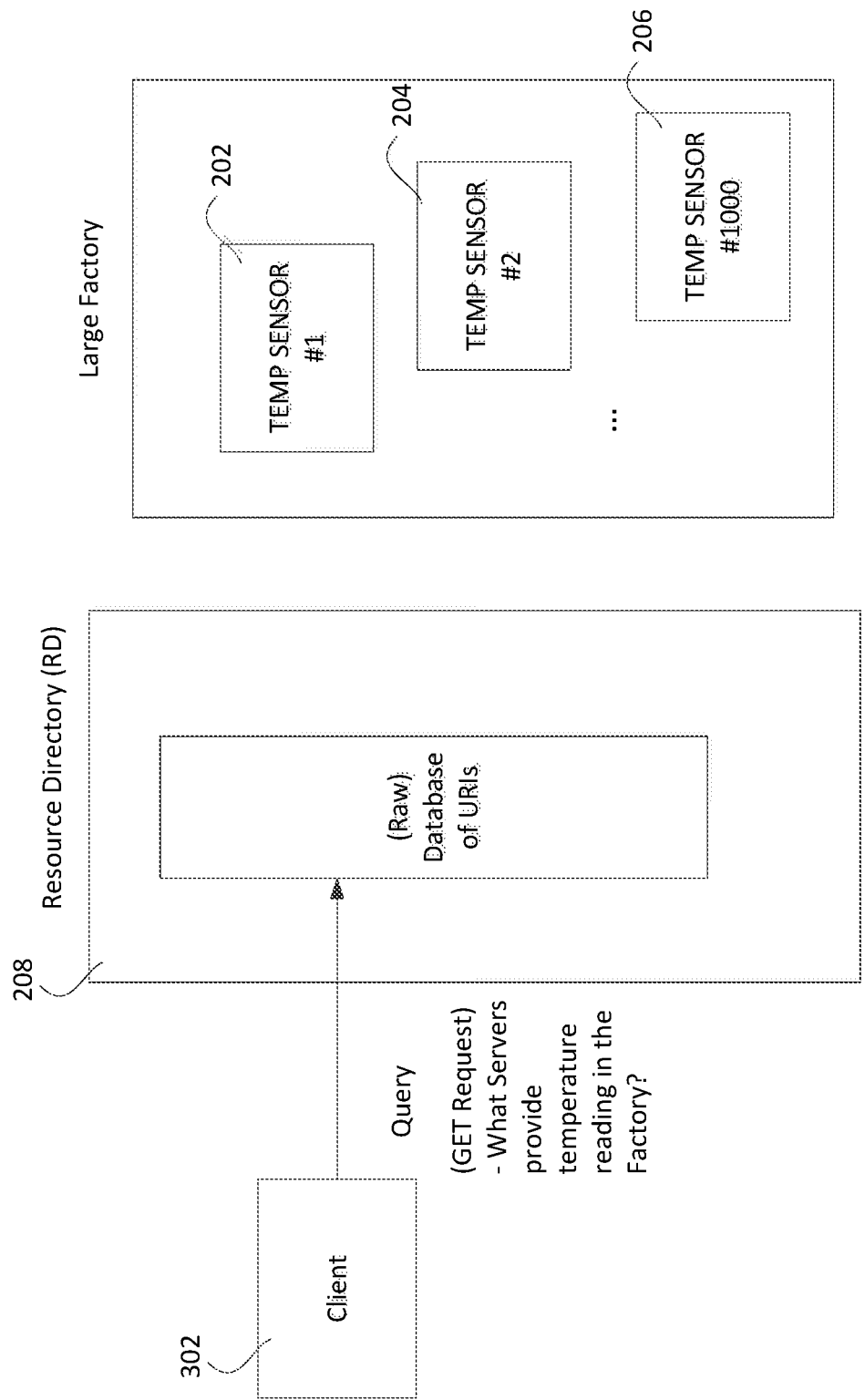
FIG. 3 is a system diagram illustrating an example in which a client queries a resource directory for a list of temperature sensors.
Figure 4:
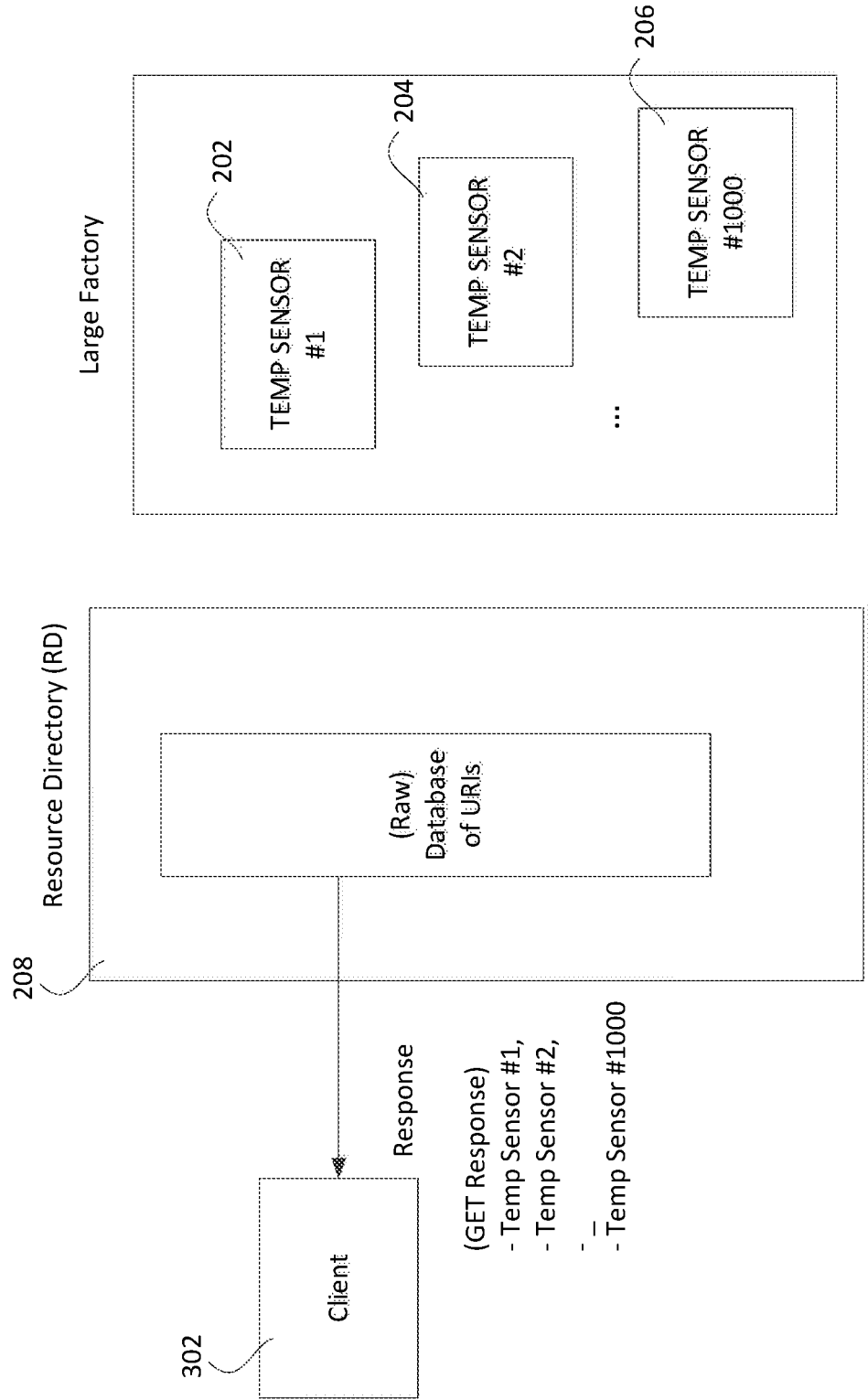
FIG. 4 is a system diagram illustrating an example in which a resource directory returns an unfiltered list of temperature sensors.
Figure 5:
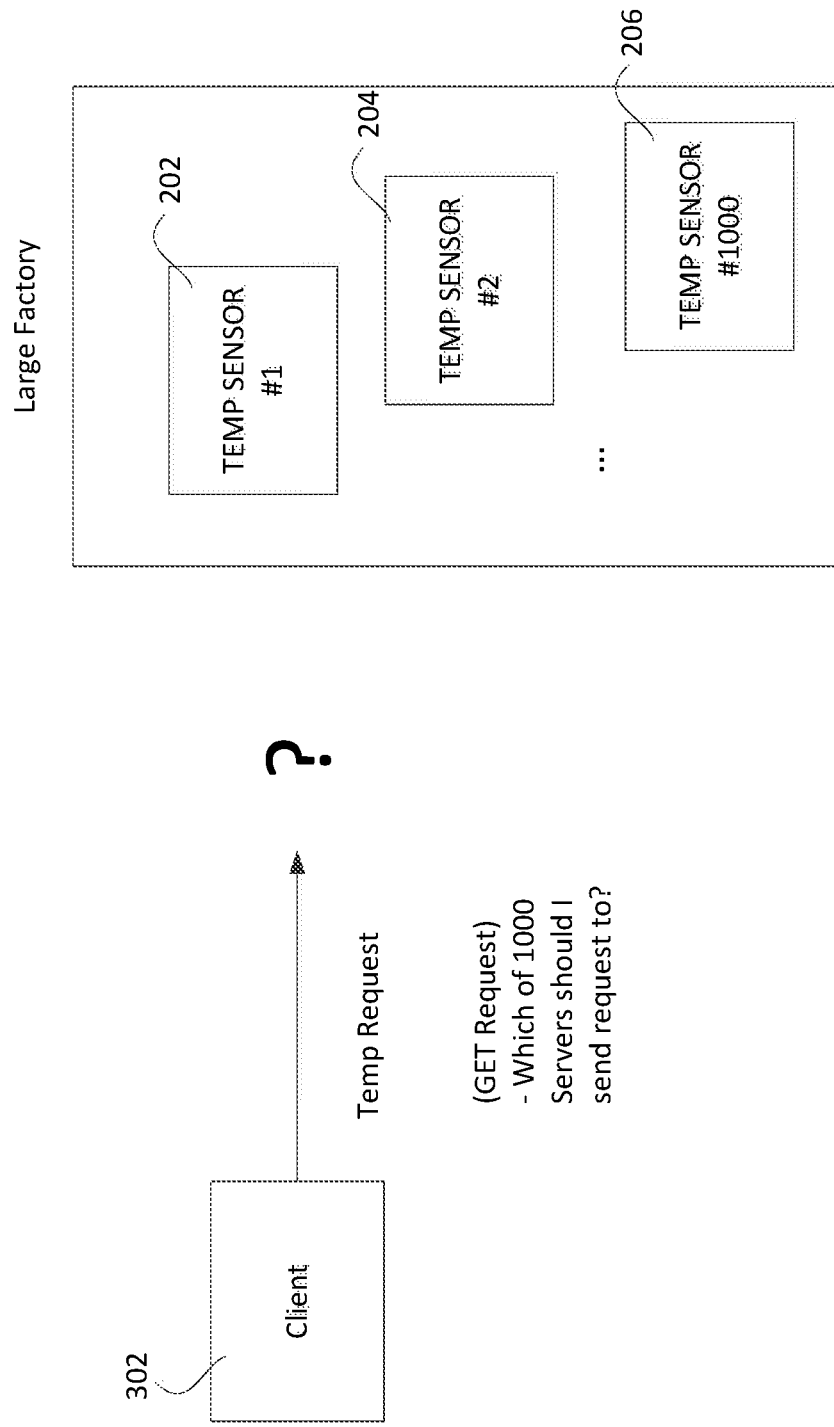
FIG. 5 depicts a client's challenge in obtaining resources from an unfiltered list of uniform resource identifiers.
Figure 6:
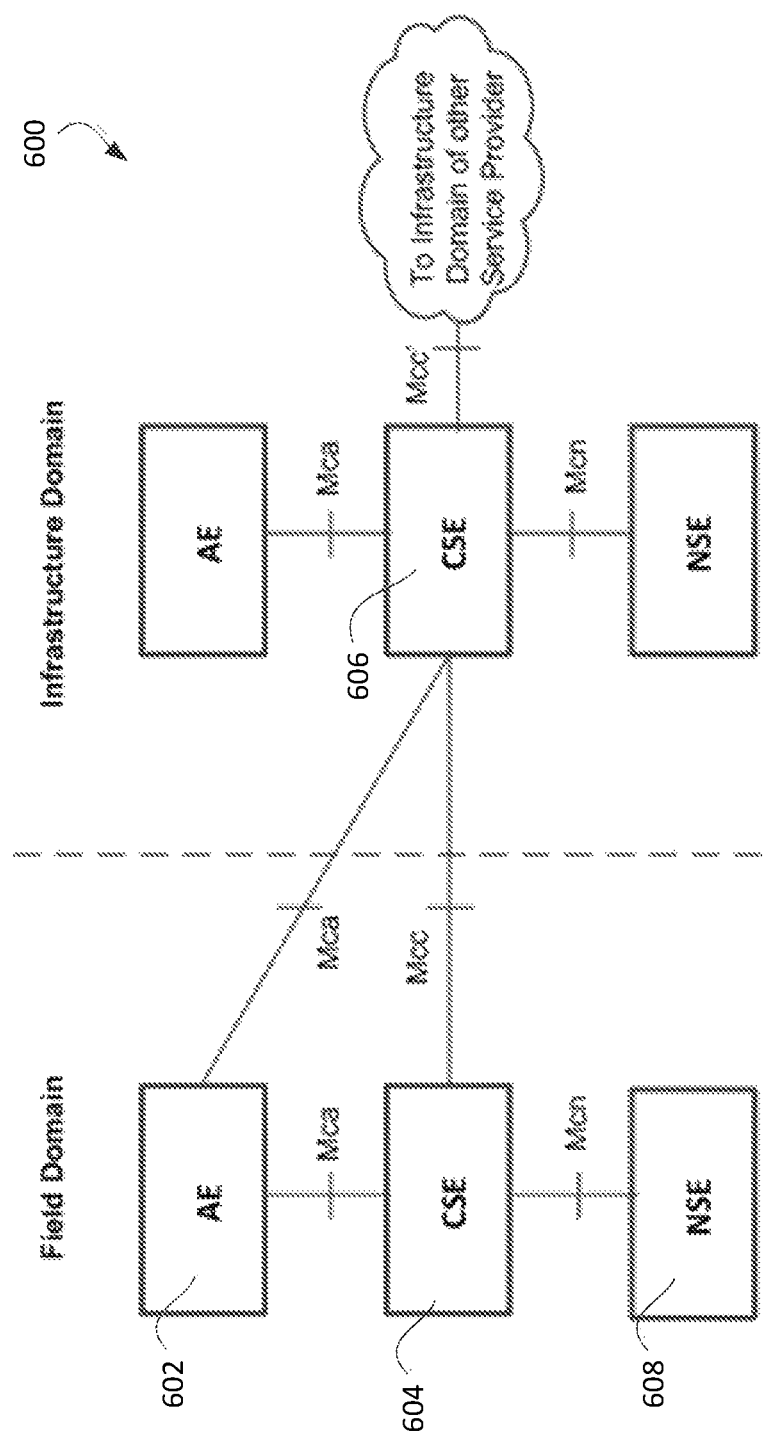
FIG. 6 is a system diagram illustrating a oneM2M service layer functional architecture.

The ensuing detailed description is provided to illustrate exemplary embodiments and is not intended to limit the scope, applicability, or configuration of the invention. Various changes may be made in the function and arrangement of elements and steps without departing from the spirit and scope of the invention.

The following abbreviations and definitions will be used in this disclosure:
AE Application Entity
CoAP Constrained Application Protocol
CORE Constrained RESTful Environments
Cross-Link A defined relationship between two URIs. Specifically, one URI points (leads) to another URI.
CSE Common Service Entity
CSF Common Service Function
HTTP HyperText Transfer Protocol
IETF Internet Engineering Task Force
IoT Internet of Things
M2M Machine-to-Machine
NSE Network Service Entity
RD Resource Directory
Resource A network data object, or SW process, that can be identified by a URI and accessed by a web transfer protocol.
REST Representational State Transfer
  (A stateless, request/response model of communication for web transfer protocols.)
SEO Search Engine Optimization
URI Uniform Resource Identifier
  (A string of characters used to identify a CoAP or HTTP resource.)
Web Search A software system that is designed to search for URIs on the web (Internet) that contain the desired information.
Web Transfer Protocol A protocol for transferring of resources across the web (Internet). HTTP and CoAP are the key protocols for IoT. The applications that use web transfer protocols can vary widely. One example is a web browser (client) and content server (e.g. security video camera). Another example is a temperature sensor software (client) and control server.

The evolved RD of the present disclosure may provide filtered and prioritized search results to a client search query to a RD. This may allow a client to scan through an optimized search result to quickly select the best URI(s) for the resources that it is looking for. In an example embodiment, the architecture of an RD includes RD functional blocks and a processing sequence with respect to initially storing URIs and later responding to client search requests. The RD functional blocks may include the following URI ranking/filtering functions used in providing the best search results to the client:

Sleepy Node Handling: Ranking higher the URIs that correspond to servers that are currently awake at the time of the client search request. URIs associated with currently asleep clients can either be filtered out or ranked lower.

Quasi-Load Balancing Handling: Ranking higher the URIs that correspond to servers having less perceived load.

Context Handling: Filtering of URIs to reduce the number of URIs that are representing similar physical properties (e.g. temperature sensor) and are from the same logical domain (e.g. sub-network). Also, ranking higher of URIs that belong to a multicast group, or are in the same geo-location as the requesting client.

URI Cross-Linking Handling: Checking for links between URIs which are generally indicative of high value URIs, and ranking those URIs higher.

In one embodiment, existing IETF protocols may be changed to support indicating ranking of URIs in search results sent to the client from the RD. Moreover, the client may optionally indicate the range of ranks and other information that it is interested in the initial search request query.

RD Architecture

Figure 7:
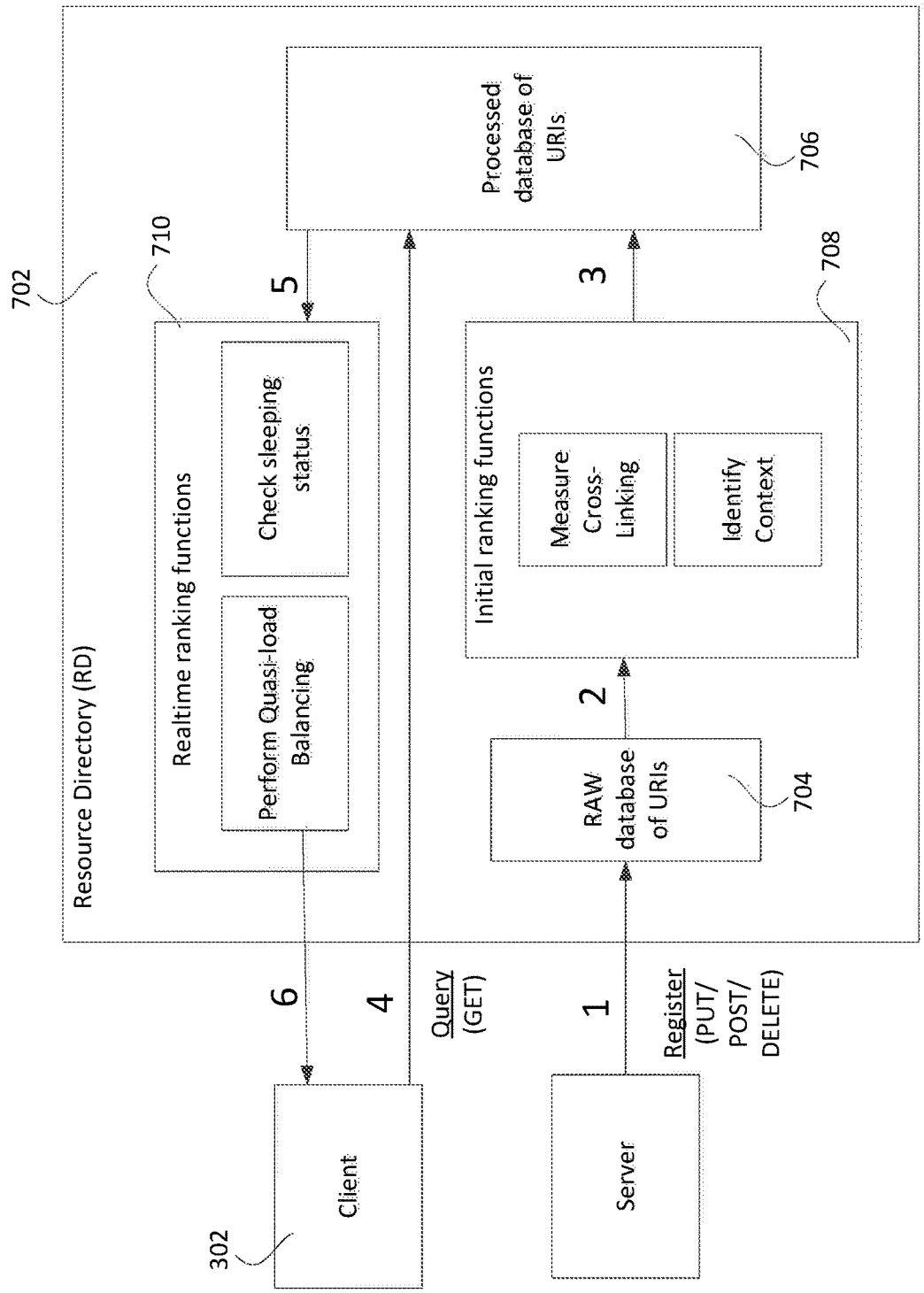
FIG. 7 is a system diagram illustrating an evolved resource directory architecture in accordance with an example embodiment.

FIG. 7 illustrates the evolved RD architecture 700 in accordance with an example embodiment. Specifically, the flow of information and processing blocks in the RD 702 are shown. Following is a high level description:

In step 1 of FIG. 7, the RD 702 may have separate logical databases for push (registration) of URIs, and pull (querying) of URIs. The registration database 704 may be the raw database of URIs received from servers registering their CoAP resources. Processed database 706 can be used for providing responses to queries.

In step 2 of FIG. 7, the RD 702 may have new processing blocks 708 for initial ranking of the URIs. The new processing blocks may include measuring cross-linking and/or identifying context to determine the initial ranking. These initial processing blocks 708 may be performed off-line or as background processing as it is independent of future client search queries.

In step 3 of FIG. 7, the initially ranked URIs are then put in a separate processed database 706 of URIs. It is noted that the raw database 704 and processed database 706 may be logically separate. They may be implemented in a single physical database, or may be implemented in separate physical databases.

In step 4 of FIG. 7, the client search query may go to the processed database 706 of the RD 702, which pulls out an initially ranked list corresponding to the client query parameters.

In step 5 of FIG. 7, realtime processing block 710 can be used for sleep status and quasi-load balancing. The RD 702 may perform a real time check based on information available within the RD to determine if the selected URIs are on a currently sleeping server or not. If the server is currently sleeping, then those "sleeping" URIs may be filtered out entirely from the response to be sent back to the client. Alternatively, the sleeping URIs may be ranked lowest. The RD 702, may also perform a quasi-load balancing based on information within the RD 702 to ensure that the ranking functions do not wind up always top ranking the same URIs (resource servers) in the network. The quasi-load balancing is also a real-time process.

In step 6 of FIG. 7, the ranked and filtered list of URIs are returned to the client as a response to its search request. The final ranking may be a weighted average over the different processing (sub-ranking) blocks and takes into account a combination of both static (i.e. initial ranking) and dynamic (i.e. real-time ranking) state of the URIs.

As described above, an RD 702 is generally localized in scope. For example, a large city may have several RDs in different locations. However, in theory nothing prevents an RD 702 from being global in scope. The scope of the evolved RD 702 is completely an implementation and deployment choice. It is assumed that the SEO techniques described above are performed within the scope of a single RD 702.

It is understood that the functionality illustrated in FIG. 7, may be implemented in the form of software (i.e., computer-executable instructions) stored in a memory of, and executing on a processor of, a node of an M2M network (e.g., a server, gateway, device, or other computer system), such as one of those illustrated in FIG. 18C or 18D described below.

RD Ranking and Filtering Functions

Figure 8:
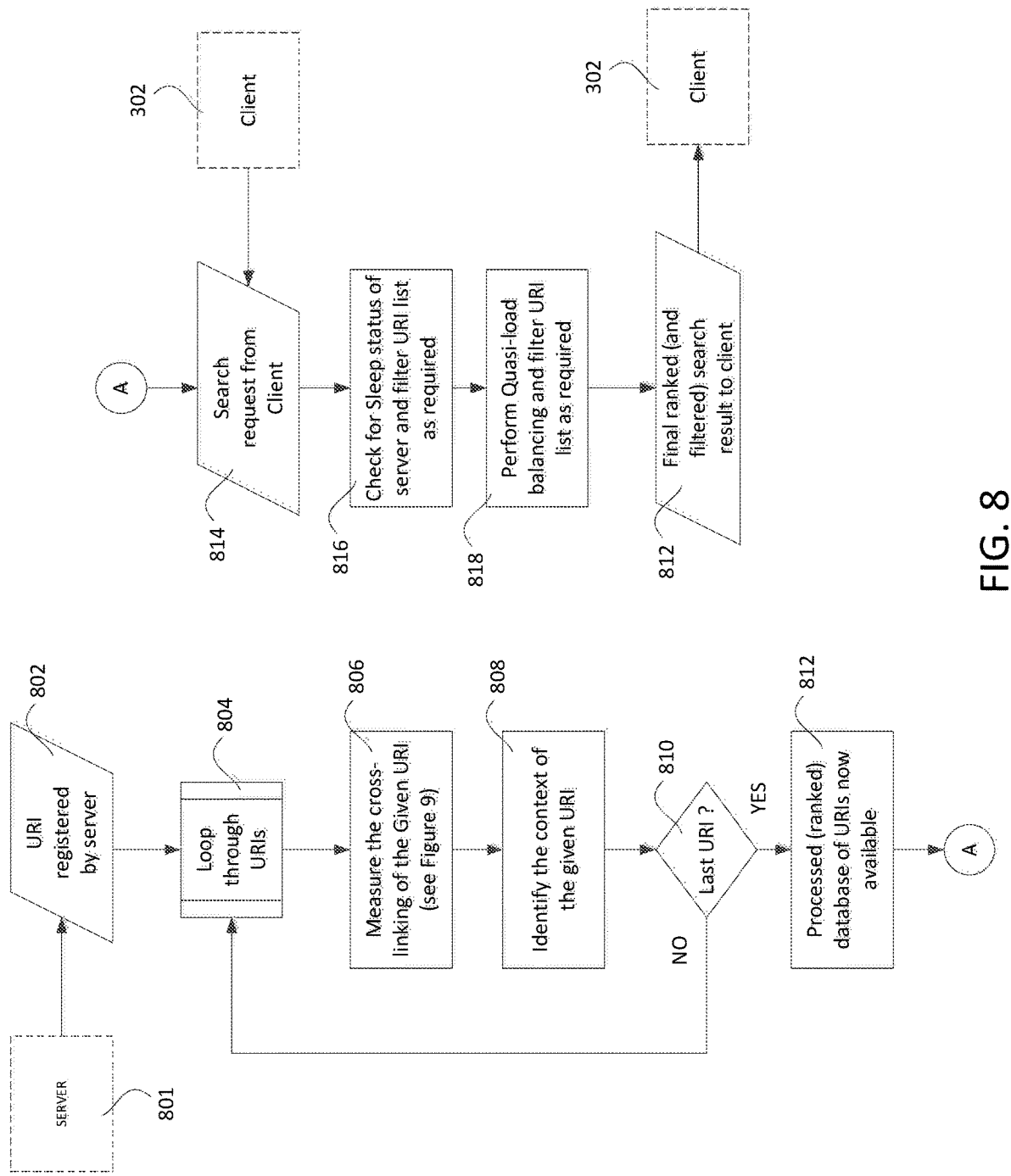
FIG. 8 is a flow diagram illustrating overall resource directory procedures in accordance with an example embodiment.

FIG. 8 illustrates overall RD procedures in accordance with an example embodiment. The overall RD procedures in an evolved RD 702 may include several ranking and filtering functions as illustrated in FIGS. 7 and 8. The key output of the overall RD 702 procedures in FIG. 8 may be a list of URIs where each of the URIs in the list is associated with a ranking that will be used as the response to the client search request. It is also noted that some or many URIs may normally be filtered out from the final output of the RD procedures and may not be seen by the client.

In step 802, of FIG. 8, a URI is registered by the server 801.

Steps 804, 806, 808 and 810 of FIG. 8, form a loop used to process a ranked database of URIs. In the loop of FIG. 8, step 806 is used to measure the crosslinking of a URI and step 808 is used to identify the context of a given URI.

At step 812 of FIG. 8, the database of URIs is processed.

Steps 814, 816, 818 and 820 of FIG. 8 show the RD 702 responding to a request from a client 302.

In step 814 of FIG. 8, a search request is received from a client 302.

In step 816 of FIG. 8, the final ranked and filtered search is provided to the client 302.

The entire RD procedures shown in FIG. 8 may need to be re-run between identical search requests from clients (i.e queries with same input parameters). This is primarily because of the real-time ranking functions. This component may result in different ranking output over time. In addition, variations of the RD procedures can achieve the same result of ranking. For example, URIs may first be sorted into different groups (e.g. group of URIs with cross-links, and another group without cross-links). Then it may not be required to loop through all URIs every time a new URI is registered as shown in FIG. 8.

In one embodiment, the rank parameter associated with each URI is recommended to be an absolute value between (0-63). This may provide enough values to distinguish rank between various URIs without becoming overly large. Multiple URIs may also wind up having the same rank value. The final rank parameter for a given URI may be calculated as a weighted average of the different rank sub-rankings (e.g. cross-link, context, etc.). For example:

$$Rank = (Weight\_1 \times Rank\_cross-link + Weight\_2 \times Rank\_context + Weight\_3 \times Rank\_sleeping + Weight\_4 \times Rank\_quasi-load-balance)/4$$

Where "Weight" may be a factor between 0-1. For example, in a system where load balancing is very important, Weight_4 should be set to 1. Alternatively, for example, if the total traffic load in the network (e.g. home with only a few devices) is known to be very low, then the Weight_4 should be set to 0.1.

The assignment of rank values and related processing may be an internal decision of each RD 702. However, the client may still get a valuable and unambiguous ranked output list of URIs that meets its input search criteria. This may follow the same approach as used in the current regular Internet, where each search engine (e.g. Google, Bing) may return a different ranked list of URIs for the same input search parameters. This can easily be seen, for example, if "best pizza" is typed into Google and Bing and then the search results compared. However, the evolved RD 702 gives a different architecture and detailed guidance for how to accomplish an efficient ranking scheme for an IoT RD.

Figure 18A:
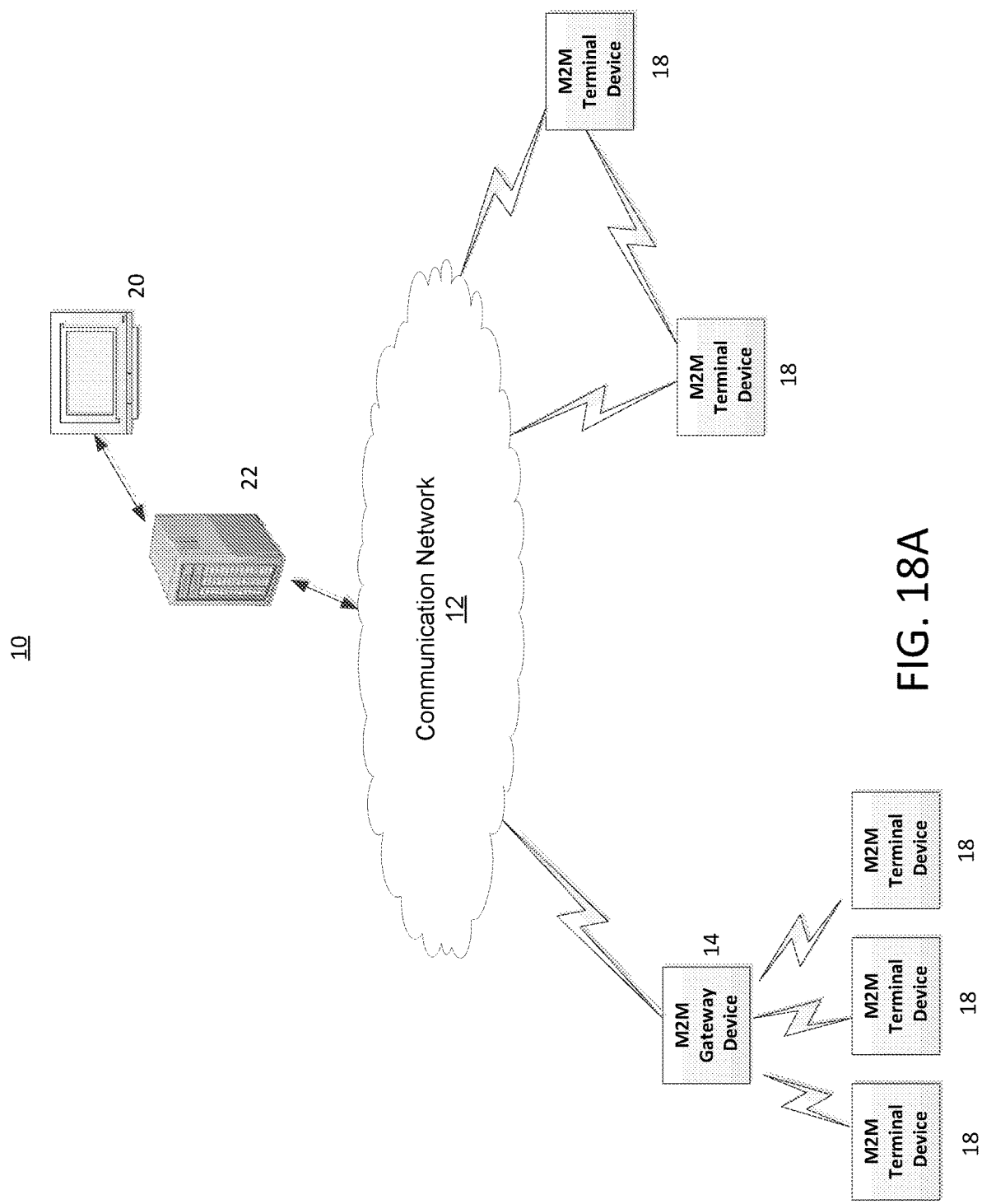
FIG. 18A is a system diagram of an example machine-to-machine (M2M) or Internet of Things (IoT) communication system in which one or more disclosed embodiments may be implemented.
Figure 18B:
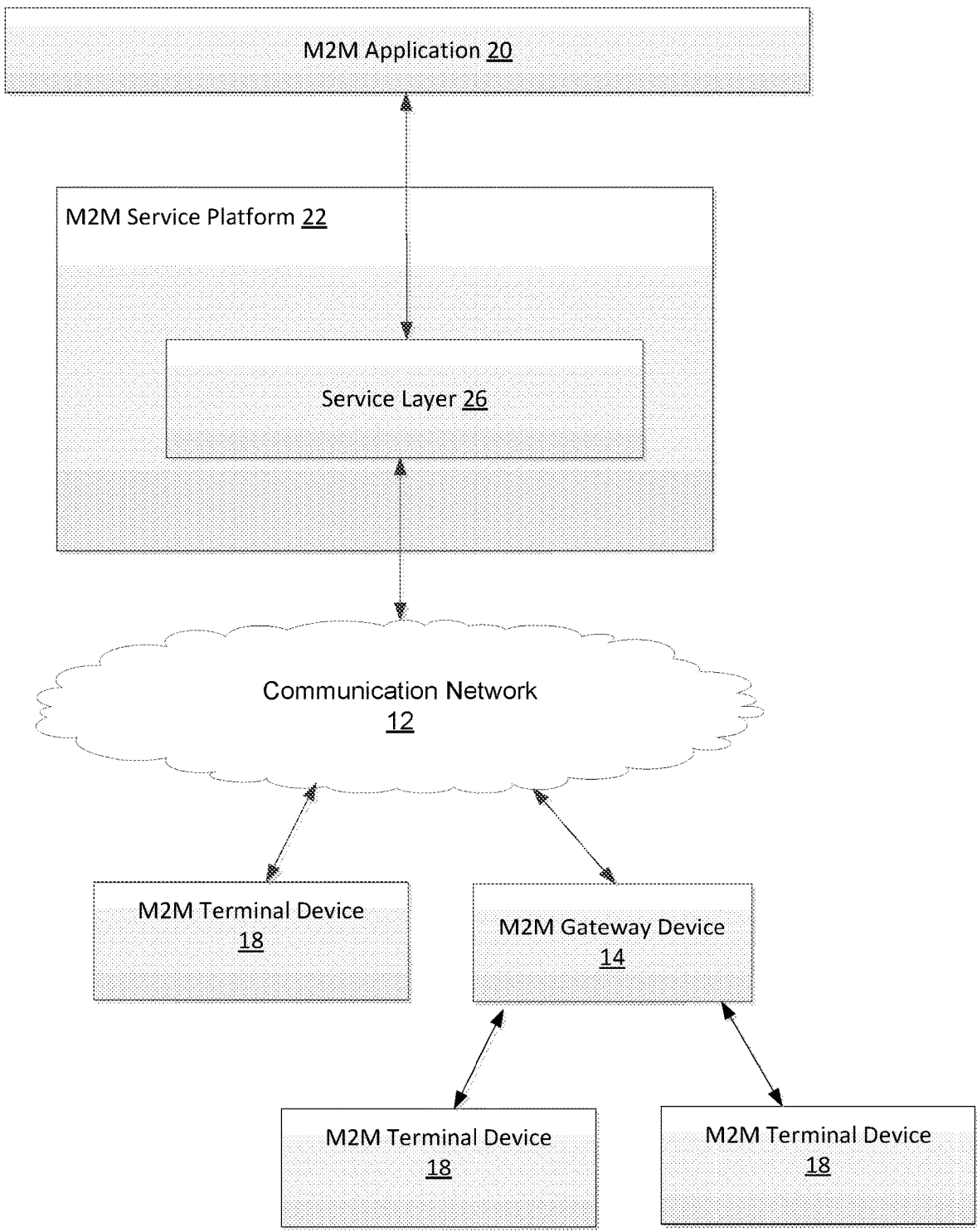
FIG. 18B is a system diagram of an example architecture that may be used within the M2M/IoT communications system illustrated in FIG. 17A.
Figure 18C:
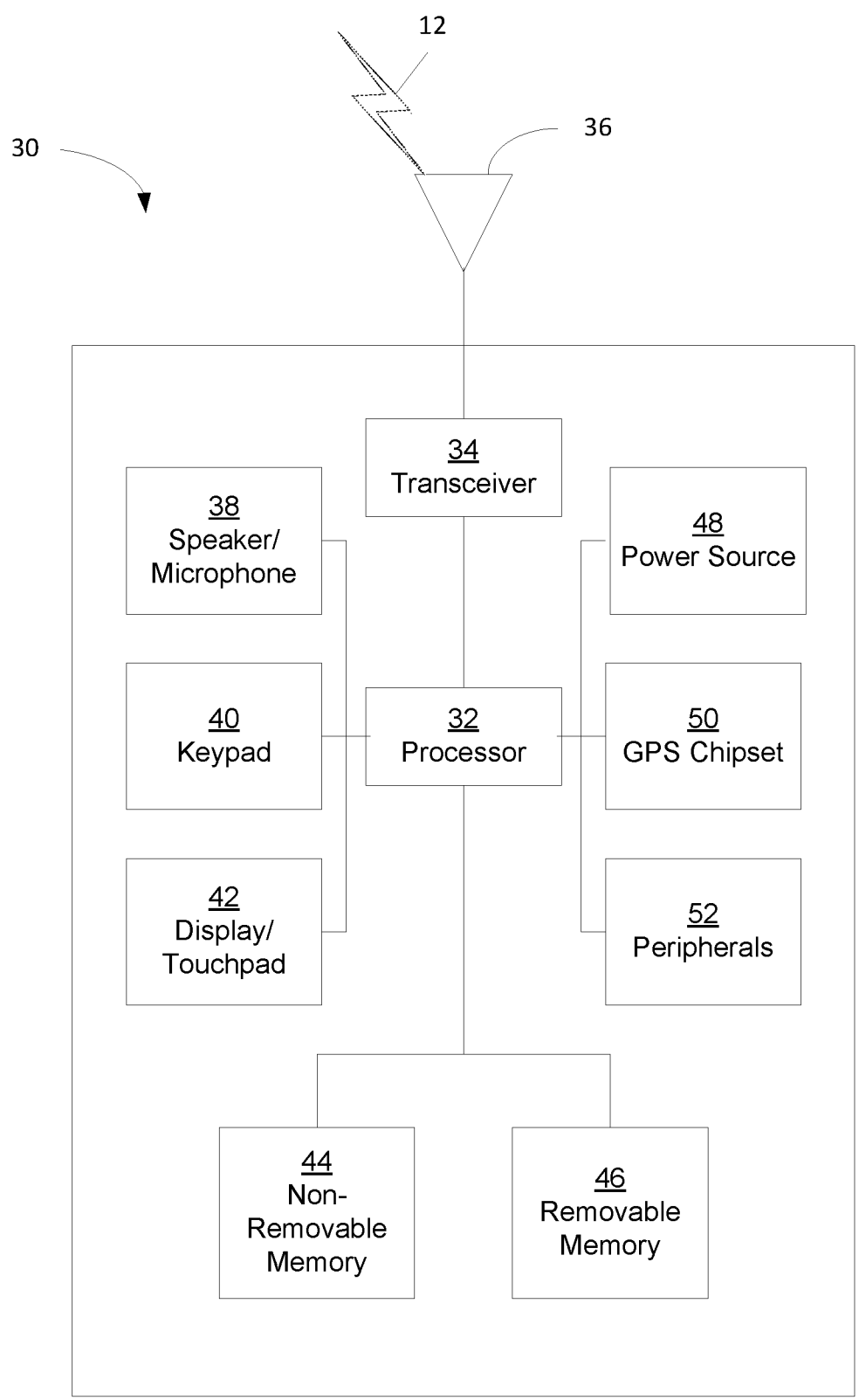
FIG. 18C is a system diagram of an example M2M/IoT terminal or gateway device that may be used within the communications system illustrated in FIG. 18A.
Figure 18D:
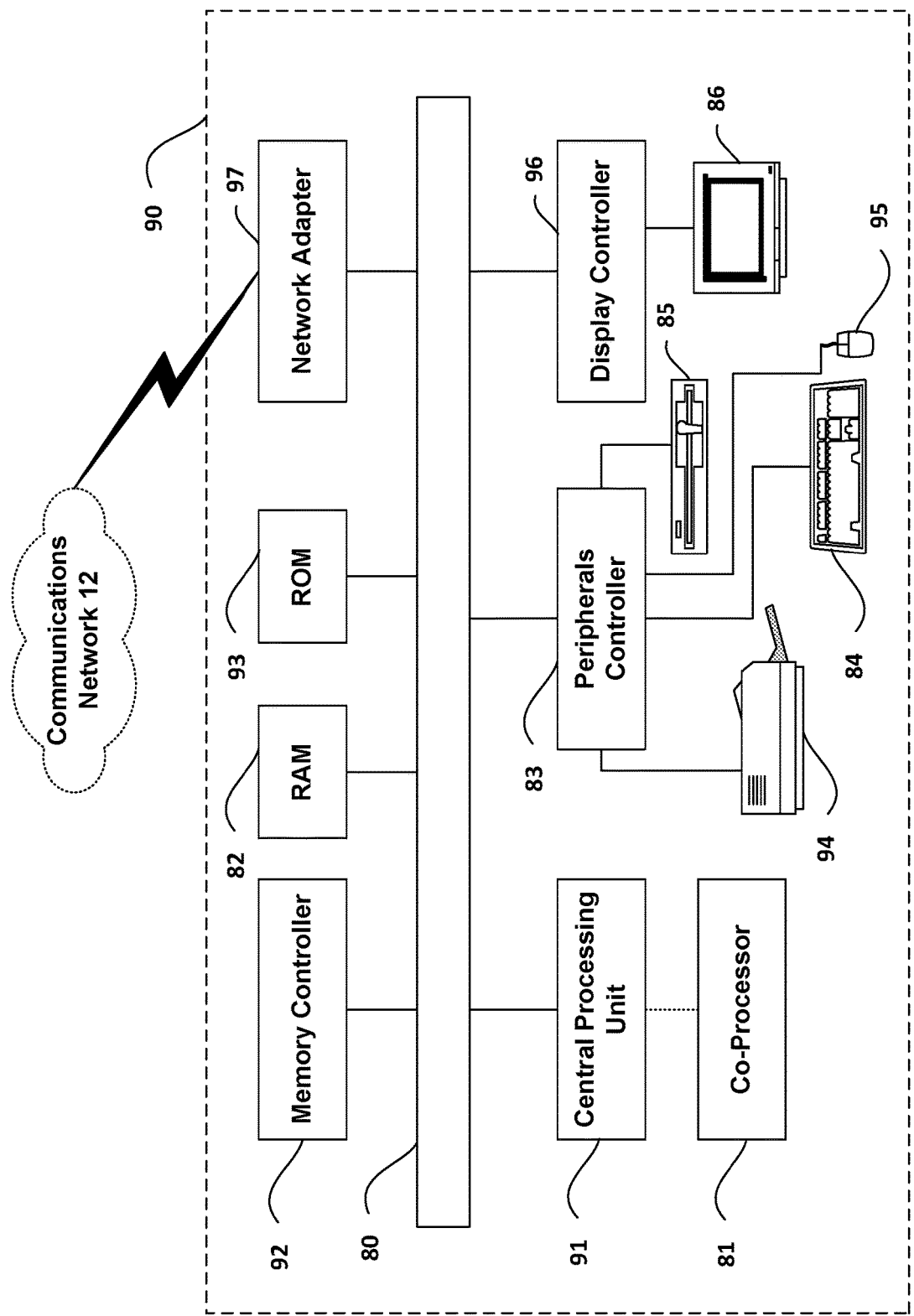
FIG. 18D is a block diagram of an example computing system in which aspects of the communication system of FIG. 18A may be embodied.

It is understood that the entities performing the steps illustrated in FIG. 8 are logical entities that may be implemented in the form of software (i.e., computer-executable instructions) stored in a memory of, and executing on a processor of, a network node or computer system such as those illustrated in FIG. 18C or FIG. 18D. That is, the method(s) illustrated in FIG. 8 may be implemented in the form of software (i.e., computer-executable instructions) stored in a memory of a network node, such as the node or computer system illustrated in FIG. 18C or FIG. 18D, which computer executable instructions, when executed by a processor of the node, perform the steps illustrated in FIG. 8. It is also understood that any transmitting and receiving steps illustrated in FIG. 8 may be performed by communication circuitry of the node under control of the processor of the node and the computer-executable instructions (e.g., software) that it executes.

1. URI Cross-Linking Handling

URI cross-linking is still expected to be important in IoT. In IoT, the most common expression of a cross-link is when a URI has a defined relationship with another URI. This is sometimes also referred to as a "typed link" as described in RFC6690 "Constrained RESTful Environments Link Format" (http://tools.ietf.org/html/rfc6690), which is incorporated by reference as if the disclosure thereof is set forth in its entirety herein.

An example of a cross-link for IoT is if an alarm controller server has an alternate URI on another server for redundancy purposes. A server can indicate a related link to its URI via the link format "hosts" and "anchor" parameters. Specifically, this will be indicated by the server when registering or re-registering its resource (URI) with the RD. This IoT cross-linking may be represented as follows:

Example Scenario:
  An alarm controller server (URI-1) wants to indicate an alternate server (URI-2) for redundancy purposes
  I.E. Clients can go to URI-2 if URI-1 is not available
  So when URI-1 is registered in the RD by the server, it may indicate a cross-link to URI-2 as follows using the convention of:
  coap://home.alarm1/server1/alarm;
  anchor="coap://home.alarm2/server2/alarm";
  rel="alternate"

Thus, hosts and anchor can be used as a measure for cross-linking. As in the regular Internet, a cross-link may be assumed to be an indication of the "popularity" of the URI. That is, the more cross-links there are to a given URI, the more popular and highly ranked it should be assumed to be.

Figure 9:
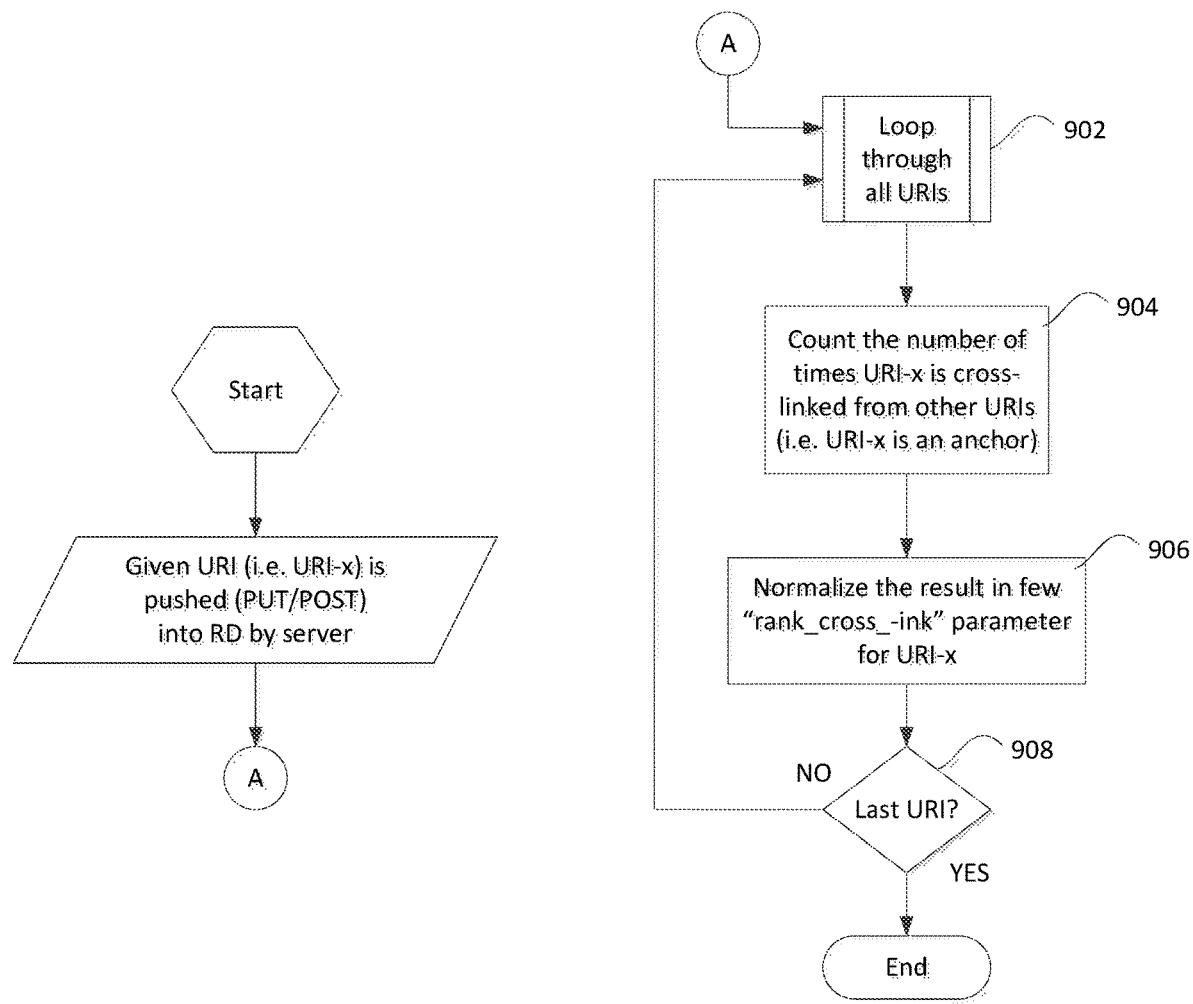
FIG. 9 is a flow diagram illustrating sub-procedures for cross-linking ranking in accordance with an example embodiment.

FIG. 9 illustrates sub-procedures for cross-linking ranking in accordance with an example embodiment. For example, once a URI is registered to the RD by a server, the RD may run the following procedure, as shown in FIG. 9, to detect cross-linking:

Steps 902, 904, 906 and 908 of FIG. 9 loop through all the URIs registered in the RD;

Step 904s and 906 of FIG. 9, count (and normalize) the number of times each given URI is cross-linked to another URI. The normalization refers to the fact that the rank parameter may have a pre-defined range and the count of the cross-links may need to be mapped into that range. For example, a pre-defined range is 0-100 and a given URI has been counted with 1000 cross-links that are the most cross-links. The RD may map the URI with 1000 cross-links to Rank 0, the highest rank. If a given URI has only 20 cross-links that are the least cross-links, the RD may map the URI with 20 cross-links to Rank 100, the lowest rank; and The result is recorded in the rank_cross-link parameter that reflects the number of cross-linking to that URI.

In an example embodiment, the procedure may re-run if the RD is ever requested by a server to delete a resource (i.e. URI) with a cross-link. Also, the procedure may be run off-line or as background processing before any future client search query that requires to populate the processed URI database where the client query will enter the RD. In another example embodiment, variations of the procedure can be run, achieving the same result of measuring cross-linking. For example, it may be able to flag URIs that have an anchor parameter and only check those URIs instead of going through all the URIs in the database as shown in FIG. 9.

It is understood that the entities performing the steps illustrated in FIG. 9 are logical entities that may be implemented in the form of software (i.e., computer-executable instructions) stored in a memory of, and executing on a processor of, a network node or computer system such as those illustrated in FIG. 18C or FIG. 18D. That is, the method(s) illustrated in FIG. 9 may be implemented in the form of software (i.e., computer-executable instructions) stored in a memory of a network node, such as the node or computer system illustrated in FIG. 18C or FIG. 18D, which computer executable instructions, when executed by a processor of the node, perform the steps illustrated in FIG. 9. It is also understood that any transmitting and receiving steps illustrated in FIG. 9 may be performed by communication circuitry of the node under control of the processor of the node and the computer-executable instructions (e.g., software) that it executes.

2. Sleepy Node Handling

Compared to regular Internet nodes, one of the key characteristics of IoT nodes is that they may often be low powered and thus will often go to "sleep". For example, IoT nodes or servers may be battery or solar powered and go into a low power mode when they need to conserve power. This has an obvious impact on the accessibility to IoT nodes or servers. That is, servers hosting URIs or containing the underlying resource content pointed to by the URI may not always be powered on to actually service CoAP requests to access these URIs. Fortunately, RDs are able to track the sleepy servers with a sleep tracking mechanism. Specifically, these RDs with the sleep tracking mechanism are expected to be aware of the sleep schedule of servers that registered URIs with them. This RD based sleep tracking mechanism determines whether a targeted resource is located on a sleepy server and a sleepy server is currently in sleep mode or not.

The sleepy severs may include several parameters, for example: 1) a sleep state indicating whether the node is currently in sleep mode; 2) a sleep duration indicating the maximum duration of time that the node stays in sleep mode; 3) a time sleeping indicating the length of time the node has been sleeping; and 4) and a next sleep indicating the next time the node will go to sleep. Theses parameters for sleepy servers can be stored by the RD and accessed by all interested clients. The RD based sleep tracking provided herein is described in the Internet draft of "Enhanced Sleepy Node Support for CoAP" updated on Feb. 12, 2014 (http://tools.ietf.org/html/draft-rahman-core-sleepy-05), which is incorporated by reference as if the disclosure thereof is set forth in its entirety herein. Thus, there will be a great benefit to the client if the RD takes into account the sleep state of the URI in the search response as described below.

Before responding to search requests for resources (URIs), but after the initial ranking functions are performed, the RD may perform an internal real time lookup of the stored sleep schedule to see if any of the selected URIs involve a currently sleeping server as illustrated in FIGS. 7 and 8. The RD may look up sequentially each of URIs in the initially ranked database or some of URIs selected based upon the term in search query. For example, if the term in the search query designates URIs to a certain resource type, the RD only looks up the sleep status of URIs having the certain resource type in the initially ranked database. The "real time" in this case is referring to the same physical (clock) time as the client search request enters the RD. This is in contrast to the initial filtering which is done at some time before the client search. The check itself is to compare the server sleep schedule already contained within the RD, and see if at the current time, the server is asleep or awake. The RD does not have to access any information external to the RD to perform this real-time check.

The rank of URIs that are currently asleep can be treated in one of two alternative ways. One alternative is to rank the "sleeping" URIs with lower rankings, as they cannot currently be accessible. The sleeping URIs may become accessible for some period in the future when the device temporarily awakes. Another alternative is to completely remove the sleeping URIs from the search result returned to the requesting client. In this alternative, the interpretation given to the search result is that it only returns URIs that are currently accessible (awake).

To be able to properly synchronize the time between the search requests for URIs and the servers going into sleep mode according to their sleeping schedule, it may be required that the RD have an accurate real-time clock function available. It is noted that the RD can be either synchronous or asynchronous of the clock in the sleeping server. In the asynchronous mode, the RD may include some safety buffer times in servicing the search requests to ensure that currently sleeping nodes are not inadvertently assumed awake due to clock drift between the RD and the servers. For example, if the stored sleep schedule indicates that a sleepy sever should have woke up 2 seconds ago and there is a few seconds of clock drift between the RD and the sleepy server, the RD may conservatively add 5 seconds of sleep to the sleep schedule and determine that the server would be sleeping another 3 seconds. The safety buffer times may be optimistic or pessimistic. This means that the RD may add or reduce the sleep time to ensure that the currently sleeping nodes are not inadvertently assumed awake. Alternatively, an RD may receive dynamic updates of a server's sleep schedule or sleep state which can allow it to periodically re-synchronize.

3. Quasi-Load Balancing Handling

IoT devices such as sensors often operate in both client and server modes. For example, when a sensor is registering a resource (URI) with an RD, the sensor is acting in a client mode. This is because in this case the client is sending a CoAP/HTTP request (e.g. PUT) to the RD that is acting as a server. And then the RD may perform a function (i.e. store the URI) and formulate the response to the client. Conversely, if a controller queries the sensor, the sensor will then be acting in the server role. This is because in this case the sensor is receiving the request (e.g. GET) and will perform a function (i.e. measure the temperature). And then, the sensor may formulate a response to the controller. Thus, the sensor is considered to be the server.

IoT servers are by their nature often constrained in their resources. It is critical that individual servers are not overloaded with requests. For example, for a given search input, if the RD happens to consistently rank a single server high, this may cause load problems on the server as many clients may naturally select that URI. Thus, it is important that the RD try to balance which server it ranks higher for a given search input based on expected load.

Load can be estimated by the RD in several ways. One way is to keep track of past search results and factoring this into current/future search results. Here, it is assumed that if a given URI is being ranked high many times, then it may be receiving relatively more traffic than lower ranked URIs. Thus, that particular URI should be ranked slightly lower in future searches as a way of indirectly load balancing it. For example, a first search result may include 10 temperature sensors where sensor 1 is rank 0 and sensor 2 is rank 1. A second time the same search is requested, the second search results may be identical to the first search result—and the ranking might be the same. However, in response to receiving the same search request a third time, the RD may determine that sensor 1 has been ranked higher the last two times that search request was made and may instead rank sensor 1 lower than sensor 2 this third time to avoid relatively high traffic on sensor 1. Thus, in the third search result, sensor 2 may be rank 0 and sensor 1 may be rank 1. In another example embodiment, the RD may also factor in a timer. For example, if the search requests are a few minutes or hours apart, and a particular URI is ranked higher than others during the few minutes or hours, the RD may determine that the particular URI should be ranked lower in future searches to avoid high traffic onto that particular URI.

Another method is to keep track of actual requests/traffic going to the URI. This is possible when the RD is physically co-located on a reverse proxy or border node where traffic is flowing through. This means that the RD has access to extra non-RD functionality. For example, a RD that is implemented in a gateway in a oneM2M-based system may know the actual requests or traffic going to the URI because the gateway keeps statistics of the requests or traffic to URIs and RD can access the statistics. Moreover, servers themselves may provide useful information such as if they are battery or mains-powered, their battery level, etc. For example, among the battery-powered and mains-powered servers, a RD may choose to lower the rank of battery powered servers to conserve its battery. In another example, the RD may rank a low-battery server lower than high-battery server to conserve its battery. Again these may come from an out of band information source such as part of an Operations and Maintenance system (configuration information) that the RD can take into account when providing search results. There may also be strong interaction between this function and the Context Handling described below.

This quasi-load balancing function may give a partial and not complete load balancing solution. This is because a full load balancing solution would require more accurate knowledge of the actual load in servers including traffic generated by the server. However, this may be outside the scope of an SEO RD solution. This quasi-load balancing is mainly based on the perceived load from an internal RD estimate.

4. Context Handling

Context, in this case, may refer to the physical or logical relation of a URI to other related URIs. Examples may include:

A URI in the same logical domain (e.g. sub-network) as other similar URIs (e.g. temperature sensors)

A URI that belongs to a given IP multicast group (e.g. all lights on 4th floor)

A URI that is physically (i.e. geo-location) close to other similar URIs

A URI that does not belong to any group (i.e. is unicast)

IoT scenarios often involve a large number of sensors measuring the same physical property (e.g. temperature, humidity, etc.) over a limited geographical area (e.g. building, field, neighborhood, etc.). The RD is aware of the characteristic of the sensor based in the "resource type (rt)" parameter received from the registration information. Thus, one useful filtering method may be for the RD to select a subset of sensors with the same resource type and belonging to the same "domain" as defined in, for example, an internet draft of CoRE Resource Directory updated on Dec. 11, 2013 (http://tools.ietf.org/html/draft-ietf-core-resource-directory-01). For example, if there are 1000 temperature sensors in the same domain (e.g. building sub-network), then the RD can choose to report back only a small subset of these sensors in the search result to the client based on various contexts of the sensors. The subset can also be chosen by interaction with the Quasi-Load Balancing function as described above. Alternatively, all sensors can be reported back to the client, but the chosen subset of URIs may have the high ranking value and the remaining sensors may have a much lower ranking value.

IoT may also support a group communication mode of URIs as disclosed in, for example, an internet draft of "Group Communication for CoAP" updated on Dec. 23, 2013 (http://tools.ietf.org/html/draft-ietf-core-groupcomm-18). In this mode, a single URI maps to a group of servers via IP multicast. This group communication mode is not supported currently in the regular Internet. Therefore, another very useful ranking criteria is that the RD may rank multicast URIs that are mapping to a group of servers higher than a unicast URI. For example, although each of multicast URIs may have the same rank, each of them is ranked at least one higher than the unicast URI. This is because the underlying group communication mechanism may deliver much more information per URI to a client than a unicast URI. That is, a single CoAP group communication request (e.g. GET) may return multiple responses as the request are distributed via IP multicast to multiple servers who have subscribed to that group.

The context can also be calculated based on various other criteria depending on the scenario. For example if a geo-locating feature is available in the RD, then the servers associated with the URI closest to the requesting client may be given higher priority. The geo-locating feature is disclosed in, for example, an internet draft of "A Link-Format Attribute for Locating Things" updated on 2014 Feb. 12 (http://tools.ietf.org/html/draft-fossati-core-geo-link-format-attribute-03). This may require the client to include its own location information in a standardized manner to the RD in the search request.

Signaling Changes

CoAP and HTTP related signaling may be changed to support the SEO-like functions for the evolved RD. Specifically, in an embodiment, a client can limit the size of the search response by indicating in its search request that it is interested in certain number of URIs, and/or it is interested in non-sleepy nodes. The search response from the RD may take this input into consideration, and also explicitly indicate the rank of each URI in the search response.

In an embodiment, the CORE Link Format may be updated to support the following parameter for "rank" in the search response. The CORE Link Format can be used in conjunction with either CoAP or HTTP protocols:

In the query response (i.e. GET Response) to the client, the RD may indicate the rank of the returned URIs through a new parameter (i.e. "rank"). The rank may preferably be interpreted as follows:

The rank parameter is recommended to be an absolute value between (0-63). However, this is an example encoding, and other ranges may also be used (e.g. 0-100). The key criterion may be that the ranking range should provide enough values to distinguish between various URIs without becoming overly large.

In the recommended rank encoding, the "0" rank value may be considered the top priority URI. The "63" rank value may be considered the URI with the least priority.

The returned list of URIs may be ranked contiguously starting with the first URI having a rank=0. It is noted that multiple URIs may wind up having the same rank value.

The following example shows a client performing a lookup for all endpoints with resource type temperature sensor (rt=temperature_sensor)

Request: GET coap://rd-lookup/ep?rt=temperature_sensor

Response: 2.05 Content
<coap://sensorA.home>; ep="node_A"; rank=0
<coap://sensorC.home>; ep="node_C"; rank=1
<coap://sensorB.home>; ep="node_B"; rank=2
<coap://sensorD.home>; ep="node_D"; rank=3

It is noted that a given, identical query request sent to the RD may result in different responses of ranked URIs over time. This may be primarily due to the influence of the quasi-load balancing and sleepy node checking on the URI ranking since these are time dependent.

In addition, optionally, in the initial client query (i.e. GET Request) to the RD, the client may also indicate the following preferences for both the CoAP protocol and the HTTP protocol:

The range of rank parameter values that the client may accept in the search result. For example, a client may indicate that it will only accept ranks in the range (0-10). So, in this case, the RD may need to additionally filter out any internal search results for URIs that have rank in the range (11-63).

If the client wants sleeping nodes to be included in the search result or not

The CoAP protocol is disclosed in, for example, an internet draft of Constrained Application Protocol updated on 2013 Jun. 28 (http://tools.ietf.org/html/draft-ietf-core-coap-18), which is incorporated by reference as if the disclosure thereof is set forth in its entirety herein. The HTTP protocol is disclosed in RFC2616 "Hypertext Transfer Protocol—HTTP/1.1" (http://tools.ietf.org/html/rfc2616), which is incorporated by reference as if the disclosure of which is set forth in its entirety herein.

The information such as the range of rank, resource type, and sleep status indication can be preferably included as part of the query portion of the URI string of CoAP/HTTP search request, as disclosed in RFC3986 "Uniform Resource Identifier (URI): Generic Syntax" (http://tools.ietf.org/html/rfc3986), which is incorporated by reference as if the disclosure thereof is set forth in its entirety herein. This interpretation of these query string parameters may either be standardized or may wind up being a defacto interpretation. As an example, a CoAP client query may be as follows:

GET coap://rd-lookup/ep?rt=temperature_sensor&rank=0&rank=1&sleepy=No

Where the request to the RD to lookup URIs of
Type="temperature sensor"
and Rank=(0 or 1)
and Sleepy nodes should not be included in the search result.

As described above, all the parameters defined above (i.e. rank, sleepy node indication) may be standardized in IETF or may become defacto interpretations. There is also a third possible model where these parameters may all be proprietary information based on private subscriptions and business relationships of the device manufacturers and/or network operator.

Examples

Figure 10:
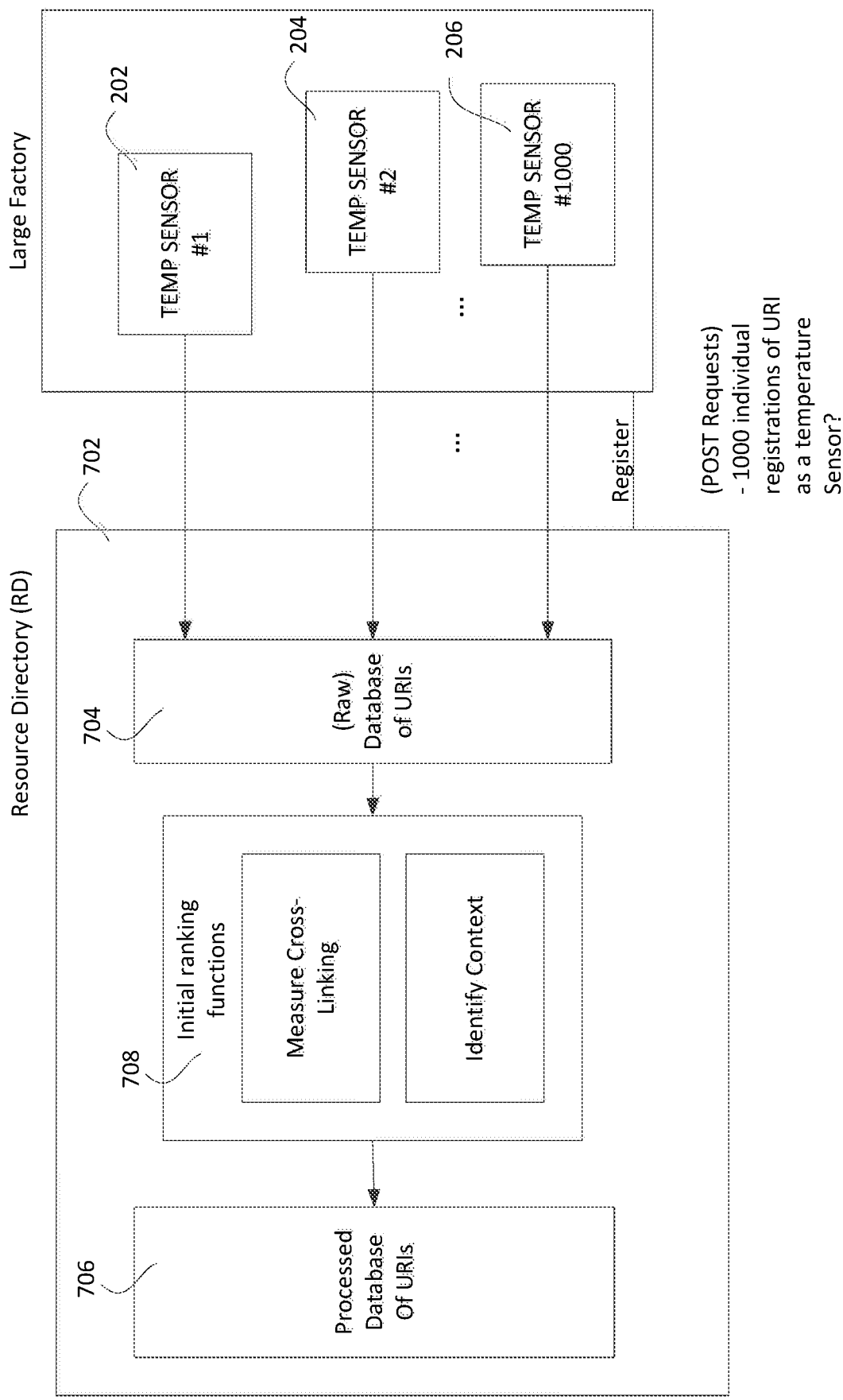
FIG. 10 is a system diagram illustrating temperature sensors registering their uniform resource identifiers with a resource directory in accordance with an example embodiment.

FIG. 10 illustrates an example of temperature sensors registering their uniform resource identifiers with a resource directory in accordance with an example embodiment. It is assumed that a large factory has 1000 temperature sensors distributed through the building. As shown in FIG. 10, each sensor may at start up register via CoAP Post their resource (URI) with the local RD 702. This may allow the RD 702 to build up a database of raw URIs. The RD 702 then may process all the URIs based on their properties such as cross linking, context, etc as described above. The ranked URIs are then stored in the processed database of the RD.

Figure 11:
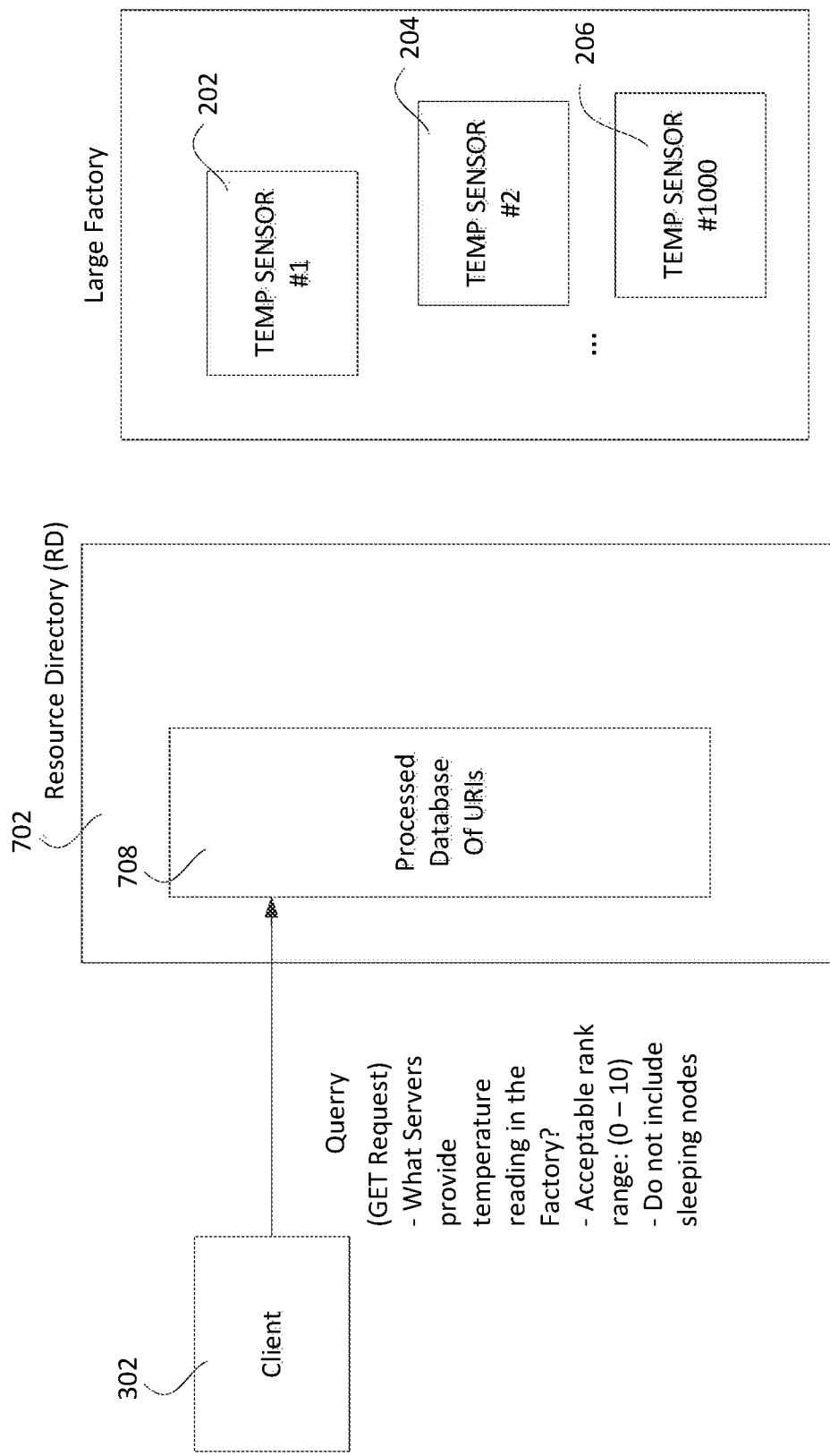
FIG. 11 is a system diagram illustrating a client querying a resource directory for a list of temperature sensors in accordance with an example embodiment.

FIG. 11 illustrates a client querying a resource directory for a list of temperature sensors in accordance with an example embodiment. After the initially ranked URIs are stored in the processed database, a client may send a search query via CoAP GET as shown in FIG. 11. The search query may request the RD 702 to identify which CoAP resources (URIs) will provide a temperature reading in the factory. That is, the query may specify resource type to be "temperature_sensor", and domain to be the factory building. Furthermore, the client may indicate that it is only interested in URIs that have a rank in the range (0-10). Also the client may indicate that it is not interested in URIs that are on a server that is currently in sleep mode.

Figure 12:
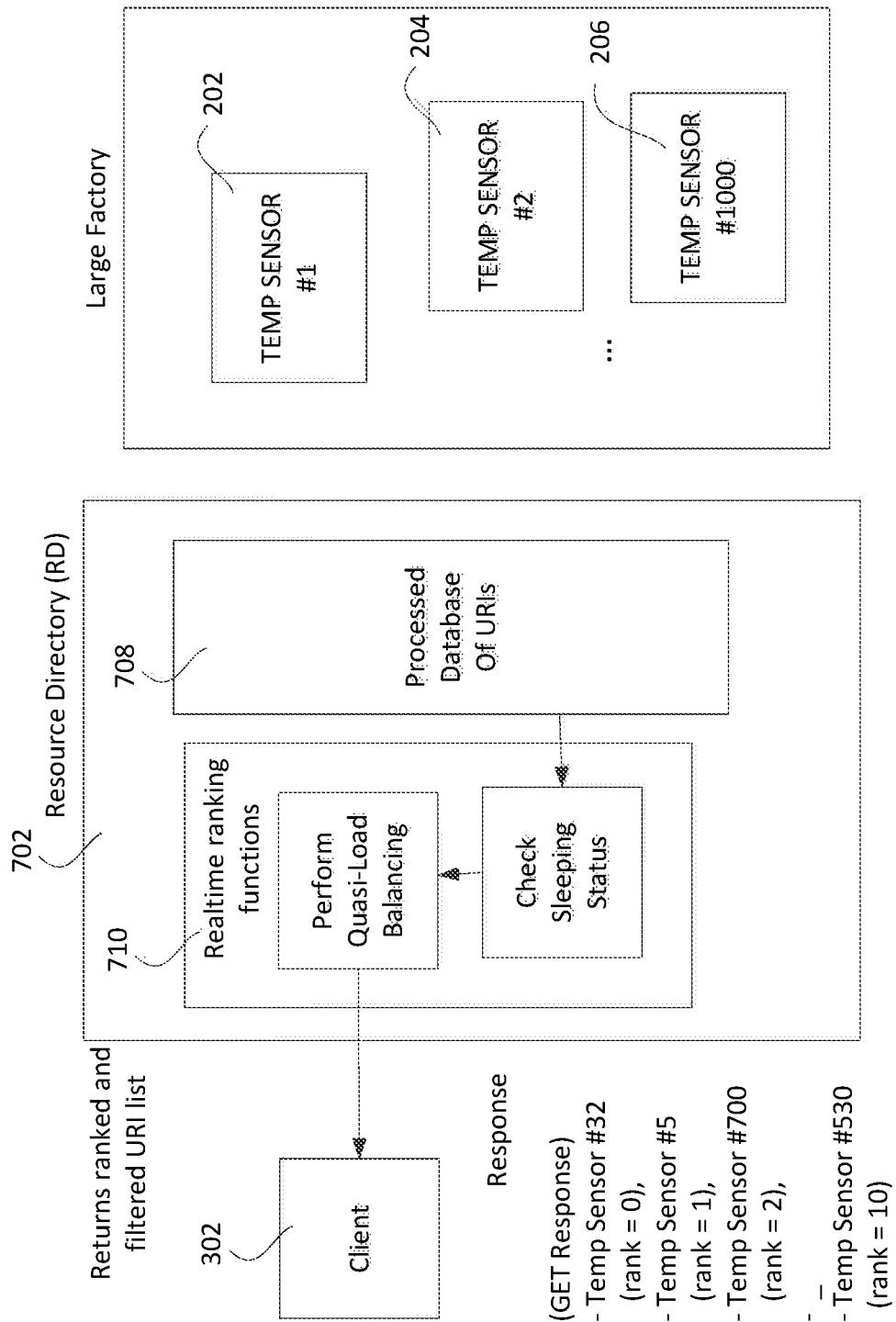
FIG. 12 is a system diagram illustrating a resource directory returning a filtered list of temperature sensors in accordance with an example embodiment.

FIG. 12 illustrates a resource directory returning a filtered list of temperature sensors in accordance with an example embodiment. Referring to FIG. 12, the RD 702 may respond via CoAP GET response with a list of prioritized URIs which is much less than 1000 entries (i.e. less than the total number of sensors). This is because the initial ranking and real-time filtering may have eliminated a large number of URIs. Some have obviously been eliminated due to the client directive on only providing URIs in the rank (0-10), and to only consider URIs that are currently not sleeping. This may be processed by the RD in the real time check for sleepy node related URIs which occurs after the URI lookup in the processed database of the RD 702.

Also, in this scenario, the sensors may have the same resource type and be located in the same domain. Thus, the RD context identification function may eliminate a large number of the URIs from the search list as they are assumed to be measuring similar (temperature) values. The other reason that the search result list is small is because it is assumed that many sensors are currently asleep.

Figure 13:
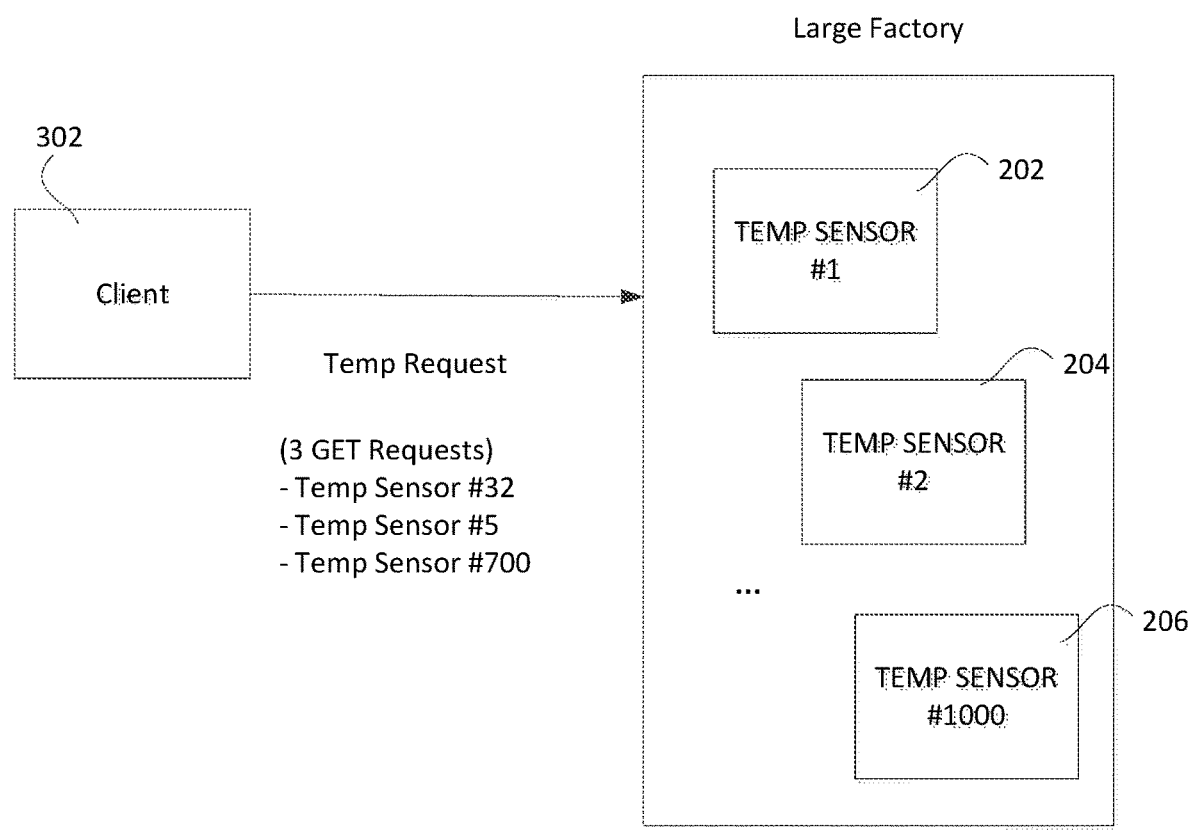
FIG. 13 is a system diagram illustrating a client fetching resources from only a set of highest ranked uniform resource identifiers in accordance with an example embodiment.

FIG. 13 illustrates a client fetching resources from only highest ranked uniform resource identifiers in accordance with an example embodiment. Referring to FIG. 13, the client then easily and efficiently may request only the top three URIs that were returned in the filtered RD search result. The final number of URIs requested may be based on the client application.

For clarity, most of the examples described herein show the use of CoAP. However, in general, equivalent functionality may be easily achieved with HTTP. Also mixed networks with HTTP and CoAP interworking may also achieve equivalent functionality as disclosed in, for example, an internet draft of Guidelines for HTTP-CoAP Mapping Implementations updated on 2014 Feb. 12 (http://tools.ietf.org/html/draft-ietf-core-http-mapping-03).

It is understood that the functionality illustrated in FIGS. 10-13, may be implemented in the form of software (i.e., computer-executable instructions) stored in a memory of, and executing on a processor of, a node of an M2M network (e.g., a server, gateway, device, or other computer system), such as one of those illustrated in FIG. 18C or 18D described below.

Figure 14:
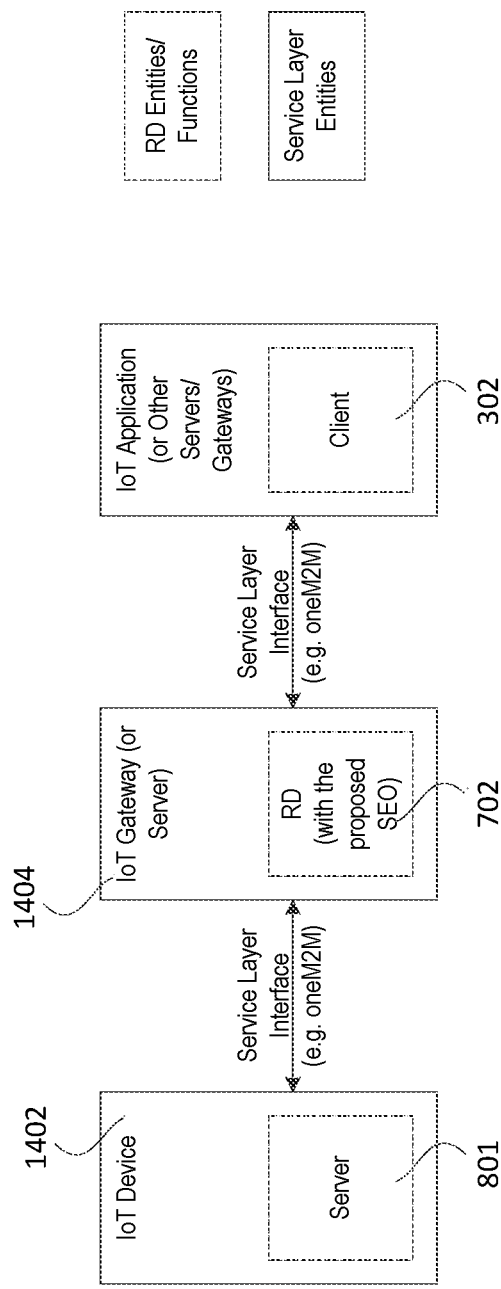
FIG. 14 is a system diagram illustrating a resource directory with search engine optimization in an M2M/IoT service layer in accordance with an example embodiment.

FIG. 14 illustrates an embodiment of a resource directory with search engine optimization implemented in a M2M/IoT service layer. As descried above, the SEO-like functions for the RD (e.g. ranking and filtering functions) may be extended to the IoT service layer, such as the layer above HTTP or CoAP layer disclosed in "oneM2M Functional Architecture," oneM2M-TS-0001 one M2M Functional Architecture-V-0.4.2, which is incorporated by reference as if the disclosure thereof is set forth in its entirety herein. An example of this embodiment is illustrated in FIG. 14 with the following main ideas:

The server 801 may reside in the IoT device 1402 (e.g. a 3GPP machine-type communication device), while the client may be a part of the IoT application The RD 702 (including the SEO-like features as described above) may be implemented as a part of the IoT Gateway 1404 or IoT Server The server 801 may register resources to the RD 702 over the service layer interface, while the client may issue queries to the RD 702 over the service layer interface as well. The RD 702 in the IoT Gateway 1404 may run the SEO-like features and return a list ranked URIs to the Client 302 over the service layer interface.

For the network shown in FIG. 14, where the RD 702 is part of an oneM2M Gateway, the scope of the RD 702 may correspond to the Gateway domain. That is, all the devices (servers) in the M2M area network served by the Gateway may register their resources to the RD 702. The RD 702 may then process and rank the URIs corresponding to these resources. A search query to the RD 702 can then come from either inside the Gateway domain or from the external Network Domain. The RD 702 may then return the search result with ranked URIs covering servers located inside the Gateway domain.

If the SEO-RD is logically implemented as part of an oneM2M Gateway as shown in FIG. 14, then the RD 702 may easily have access to statistics of the user plane traffic flowing through Gateway 1404 to/from IoT devices. This may make it simpler for the RD to implement the quasi-load balancing function as described above. Specifically, the RD 702 may be able to monitor the external requests (e.g CoAP GET) to the URIs (resources) located inside the Gateway boundary. This may allow the RD 702 to factor this load metric into the ranking calculations that it makes as part of the quasi-load balancing algorithm.

Figure 15:
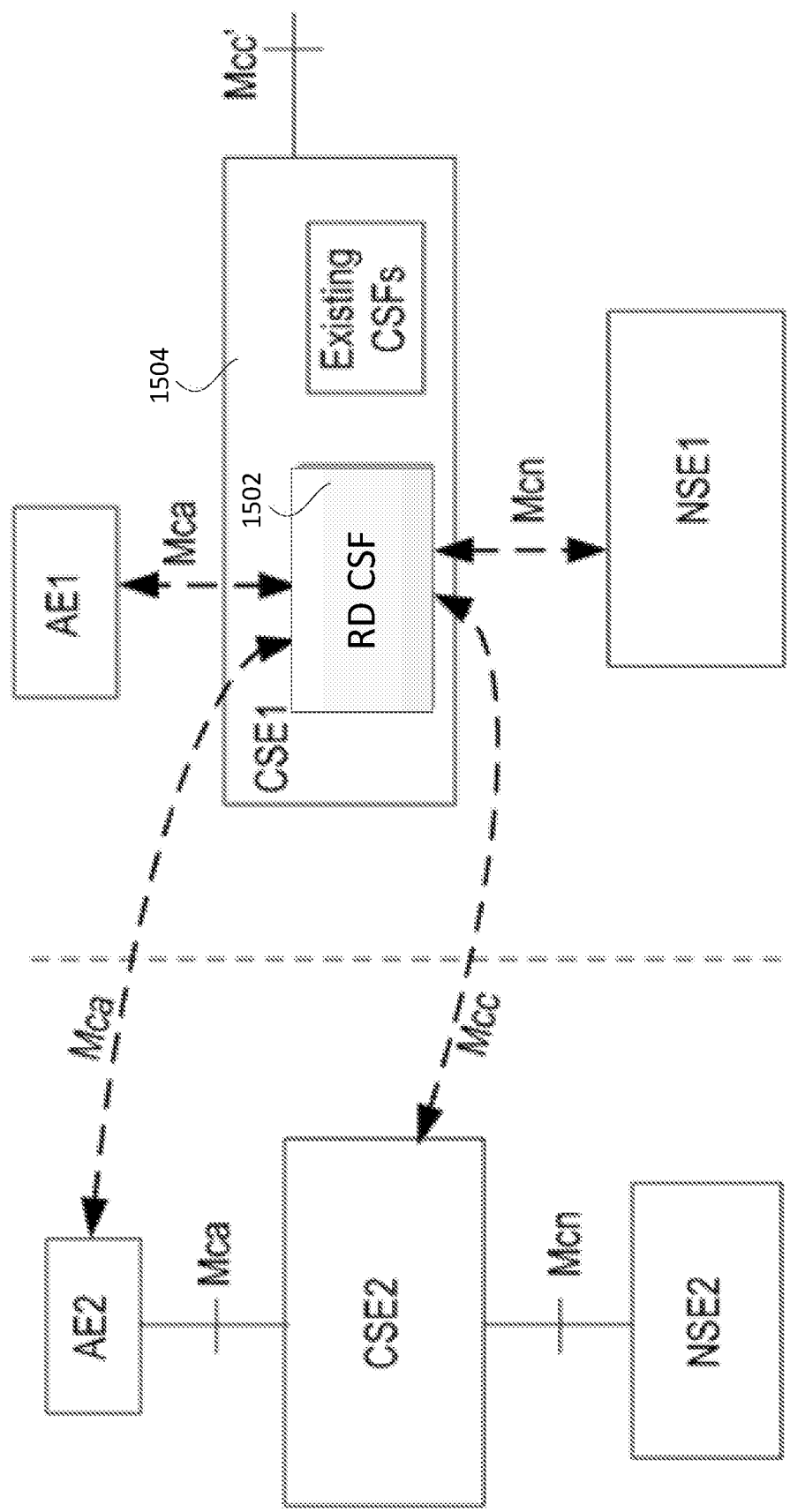
FIG. 15 is a system diagram illustrating a resource directory within a common service function in a oneM2M functional architecture in accordance with an example embodiment.

FIG. 15 illustrates a RD CSF 1502 in the oneM2M functional architecture in accordance with another example embodiment. As shown in FIG. 15, the SEO-like features (e.g. ranking and filtering) described above can be implemented as a new oneM2M CSF (referred to as the RD CSF 1502) and as a part of an oneM2M CSE. The CSE1 1504 may be an M2M/IoT gateway or server. The RD CSF 1502 may have the following functions:

It may accept resource registration from an AE or an CSE and maintain all registered resources.

It may rank registered resources according mechanism as described above.

It may process resource queries from an AE or an CSE and return a list of filtered resources as described above. It is understood that the functionality illustrated in FIGS. 14-15, may be implemented in the form of software (i.e., computer-executable instructions) stored in a memory of, and executing on a processor of, a node of an M2M network (e.g., a server, gateway, device, or other computer system), such as one of those illustrated in FIG. 18C or 18D described below.

Figure 16:
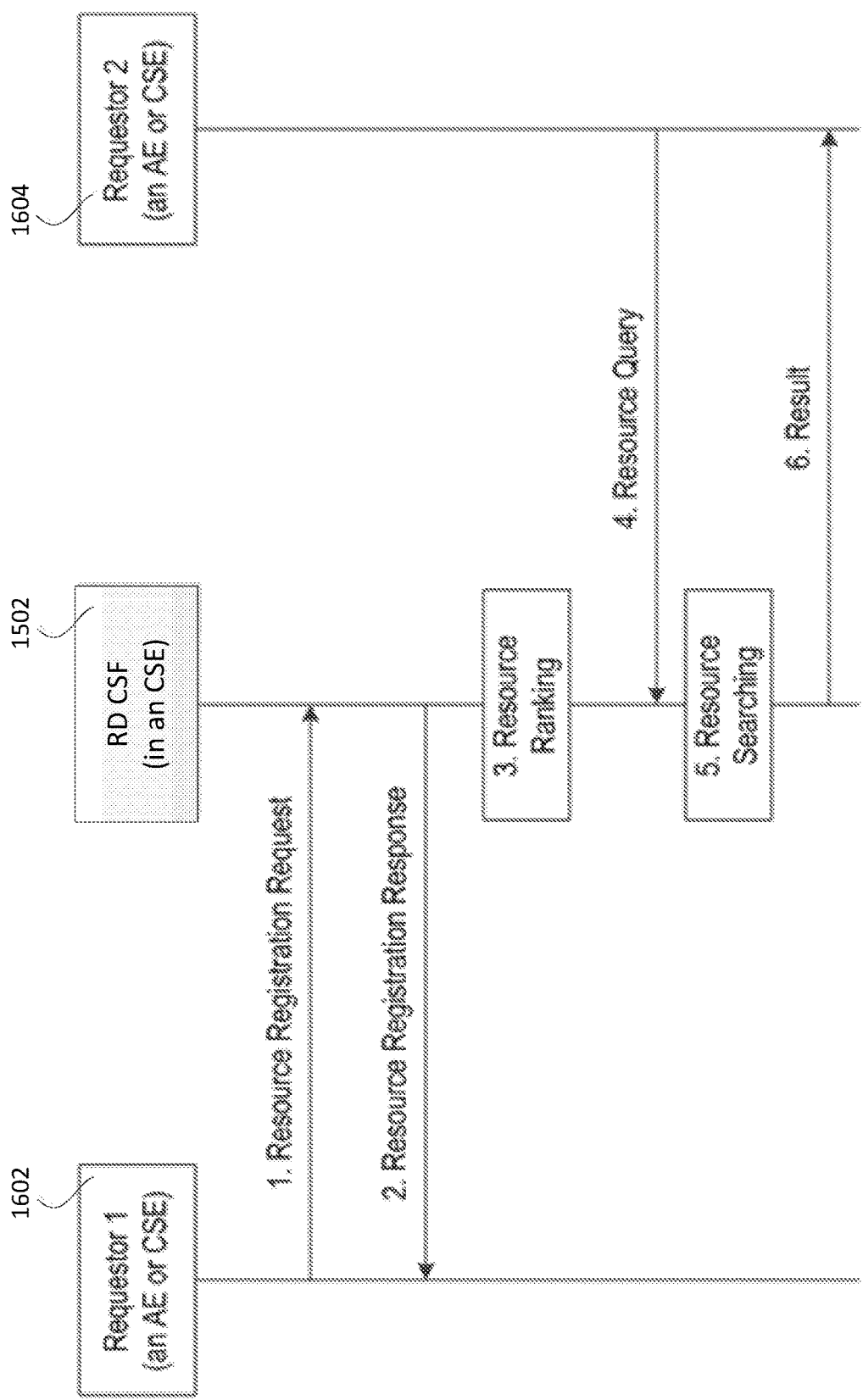
FIG. 16 is a flow diagram illustrating resource directory procedures within a common server function for resource registration and resource query in accordance with an example embodiment.

FIG. 16 illustrates a resource registration procedure and a resource query procedure based on the RD CSF 1502 shown in FIG. 15:

In step 1 of FIG. 16, Requestor 1 1602 (e.g. an AE or a CSE) may send a Resource Registration Request message to RD CSF 1502. This message may contain the following information: 1) a list of resources to be registered; 2) the attributes of each resource such as its URI, cross-link, load, context, location, and sleep schedule as described above.

It is noted that this step can be realized using the existing Resource Announcement in oneM2M, but extra attributes may need to be added (i.e. cross-link, load, context, location, sleep schedule as described above) for each announced resource.

In step 2 of FIG. 16, the RD CSF 1502 may send a Resource Registration Response back to the Requestor 11602.

In step 3 of FIG. 16, the RD CSF 1502 may rank all registered resources according to the methods described above.

In step 4 of FIG. 16, requestor 2 1604 (e.g. an AE or a CSE) may send a Resource Query message to the RD CSF 1502. This message may contain the following information: 1) search criteria such as desired ranks, desired resource location, desired resource load as described above.

It is noted that this step may be implemented using the existing Discovery CSF in oneM2M with new criteria such as desired ranks as described above.

In step 5 of FIG. 16, the RD CSF 1502 may search its maintained resources based on criteria contained in Step 4 according to the method described above.

In step 6 of FIG. 16, the RD CSF 1502 may send Result to the Requestor 2 (i.e. a list of discovered resources).

An AE or CSE itself may be a kind of resource. Then the announced resources by the AE or CSE can be regarded as its cross-link. As a result, an AE or CSE with more announced resources (i.e. more cross-links) may be assigned with higher rank and they may be discovered and returned to Requestor 2 with a higher probability.

It is also noted that, in another embodiment, instead of providing the SEO-like features of the present disclosure in a new RD CSF, those feature may be implemented as a modification to the existing Discovery-CSF in oneM2M. In that alternative embodiment, the same procedure in FIG. 16 may be applied—just replace RD CSF with the modified Discovery CSF.

It is understood that the entities performing the steps illustrated in FIG. 16 are logical entities that may be implemented in the form of software (i.e., computer-executable instructions) stored in a memory of, and executing on a processor of, a network node or computer system such as those illustrated in FIG. 18C or FIG. 18D. That is, the method(s) illustrated in FIG. 16 may be implemented in the form of software (i.e., computer-executable instructions) stored in a memory of a network node, such as the node or computer system illustrated in FIG. 18C or FIG. 18D, which computer executable instructions, when executed by a processor of the node, perform the steps illustrated in FIG. 16. It is also understood that any transmitting and receiving steps illustrated in FIG. 16 may be performed by communication circuitry of the node under control of the processor of the node and the computer-executable instructions (e.g., software) that it executes.

Figure 17:
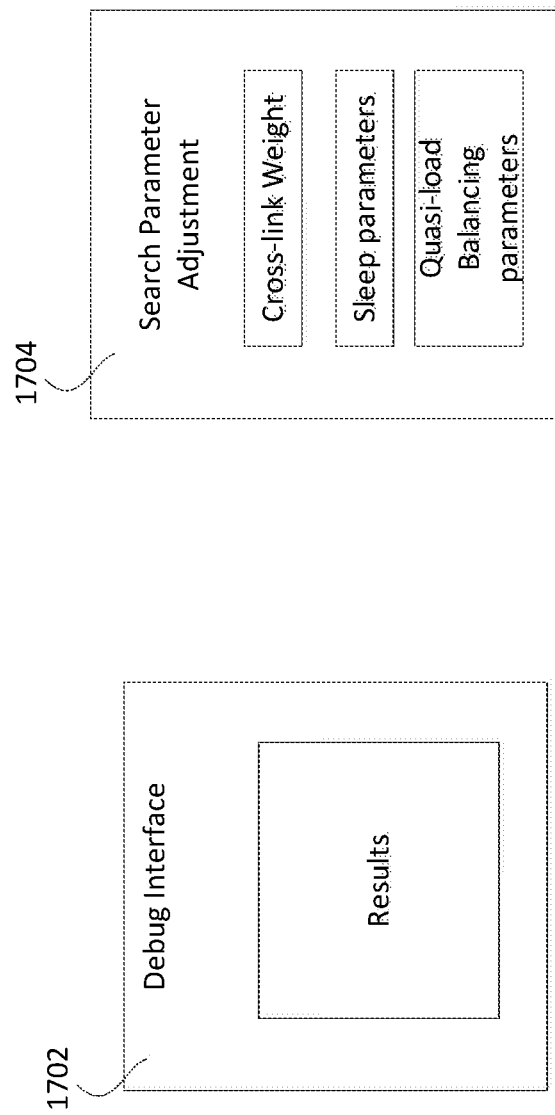
FIG. 17 is a diagram of Graphical User Interfaces.

Interfaces, such as Graphical User Interfaces (GUIs), can be used to assist user to control and/or configure functionalities related to the search engine optimization for the resource directory. FIG. 17 is a diagram that illustrates a debug interface 1702 that allows a user to view the results of a search into a resource directory to understand the operation of the search system. FIG. 17 also illustrates an interface 1704 used to adjust search parameters used in the search engine for the resource directory. It is to be understood that interfaces 1702 and 1704 can be produced using displays such as those shown in FIGS. 18C-D described below.

Example M2M/IoT/WoT Communication System

FIG. 18A is a diagram of an example machine-to machine (M2M), Internet of Things (IoT), or Web of Things (WoT) communication system 10 in which the SEO-like functions for the evolved resource directory as described herein may be implemented. Generally, M2M technologies provide building blocks for the IoT, and any M2M device, gateway or service platform may be a component of the IoT as well as an IoT service layer, etc.

Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as Resource directory 208 and 702, sensors, such as sensors 202, 204 and 206, client 302, AE 602, CSE 604, 606 and 1504, NSE 608, databases 704 and 706, initial ranking functions 708, real-time ranking functions 710, server 801, IoT device 1402, IoT Gateway (or server) 1404, RD CSF 1502, requesters 1602 and 1604 and logical entities to produce interfaces such as interfaces 1702 and 1704

As shown in FIG. 18A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 18A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 18B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as Resource directory 208 and 702, sensors, such as sensors 202, 204 and 206, client 302, AE 602, CSE 604, 606 and 1504, NSE 608, databases 704 and 706, initial ranking functions 708, realtime ranking functions 710, server 801, IoT device 1402, IoT Gateway (or server) 1404, RD CSF 1502, requesters 1602 and 1604 and logical entities to produce interfaces such as interfaces 1702 and 1704. The M2M service layer 22 may be implemented by one or more servers, computers, devices, virtual machines (e.g. cloud/storage farms, etc.) or the like, including for example the devices illustrated in FIGS. 18C and 18D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 18B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as Resource directory 208 and 702, sensors, such as sensors 202, 204 and 206, client 302, AE 602, CSE 604, 606 and 1504, NSE 608, databases 704 and 706, initial ranking functions 708, realtime ranking functions 710, server 801, IoT device 1402, IoT Gateway (or server) 1404, RD CSF 1502, requesters 1602 and 1604 and logical entities to produce interfaces such as interfaces 1702 and 1704 may be hosted within a M2M service layer instance hosted by an M2M node, such as an M2M server, M2M gateway, or M2M device, as shown in FIG. 18B. For example, the logical entities such as Resource directory 208 and 702, sensors, such as sensors 202, 204 and 206, client 302, AE 602, CSE 604, 606 and 1504, NSE 608, databases 704 and 706, initial ranking functions 708, realtime ranking functions 710, server 801, IoT device 1402, IoT Gateway (or server) 1404, RD CSF 1502, requesters 1602 and 1604 and logical entities to produce interfaces such as interfaces 1702 and 1704 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 18C or FIG. 18D described below.

Further, logical entities such as Resource directory 208 and 702, sensors, such as sensors 202, 204 and 206, client 302, AE 602, CSE 604, 606 and 1504, NSE 608, databases 704 and 706, initial ranking functions 708, realtime ranking functions 710, server 801, IoT device 1402, IoT Gateway (or server) 1404, RD CSF 1502, requesters 1602 and 1604 and logical entities to produce interfaces such as interfaces 1702 and 1704 can implemented as part of an M2M network that uses a Service Oriented Architecture (SOA) and/or a Resource-Oriented Architecture (ROA) to access services of the present application.

FIG. 18C is a block diagram of an example hardware/software architecture of a M2M network node 30, such as an M2M device 18, an M2M gateway 14, an M2M server, or the like. The node 30 can execute or include logical entities such as Resource directory 208 and 702, sensors, such as sensors 202, 204 and 206, client 302, AE 602, CSE 604, 606 and 1504, NSE 608, databases 704 and 706, initial ranking functions 708, realtime ranking functions 710, server 801, IoT device 1402, IoT gateway (or server) 1404, RD CSF 1502, requesters 1602 and 1604 and logical entities to produce interfaces such as interfaces 1702 and 1704. The device 30 can be part of an M2M network as shown in FIG. 18A-B or part of a non-M2M network. As shown in FIG. 18C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 18C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 18C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 18C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 18D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as resource directory 208 and 702, sensors, such as sensors 202, 204 and 206, client 302, AE 602, CSE 604, 606 and 1504, NSE 608, databases 704 and 706, initial ranking functions 708, realtime ranking functions 710, server 801, IoT device 1402, IoT gateway (or server) 1404, RD CSF 1502, requesters 1602 and 1604 and logical entities to produce interfaces such as interfaces 1702 and 1704. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 18A and FIG. 18B, to enable the computing system 90 to communicate with other nodes of the network.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as Resource directory 208 and 702, sensors, such as sensors 202, 204 and 206, client 302, AE 602, CSE 604, 606 and 1504, NSE 608, databases 704 and 706, initial ranking functions 708, realtime ranking functions 710, server 801, IoT device 1402, IoT gateway (or server) 1404, RD CSF 1502, requesters 1602 and 1604 and logical entities to produce interfaces such as interfaces 1702 and 1704 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method for use in an Internet of Things (IoT) network comprising a plurality of IoT servers and a resource directory, the method performed at the resource directory, comprising:
    registering a plurality of uniform resource identifiers (URIs) received from the plurality of IoT servers;
    determining an initial ranking of the plurality of URIs based on measuring cross-links between each of the plurality of URIs;
    generating a ranked database based on the initial ranking;
    receiving a search query from a client entity;
    determining, based on the search query, a real-time ranking of the plurality of URIs in the ranked database;
    generating, based on the real-time ranking, a ranked list of the plurality of URIs, and
    providing the ranked list of the plurality of URIs to the client entity,
    wherein the real-time ranking of the plurality of URIs is determined based on checking sleep status of each of the plurality of IoT servers.

2. The method of claim 1, wherein the measuring cross-links between each of the plurality of URIs further comprises:
    counting a number of times that each of the plurality of URIs is cross-linked to another;
    mapping the number of times into a predetermined range of ranks for the each of the plurality of URIs; and
    determining, based on the mapping, a cross-link ranking for the plurality of URIs, the cross-link ranking being indicative of the number of times.

3. The method of claim 2, wherein the determining cross-link ranking for the plurality of URIs further comprises:
    determining a first URI in the plurality of URIs that has been cross-linked more than a second URI in the plurality of URIs; and
    ranking the first URI higher than the second URI.

4. The method of claim 1, wherein the initial ranking of the plurality of URIs is further determined based on identifying contexts of the plurality of URIs.

5. The method of claim 4, wherein the contexts of the plurality of URIs comprise a resource type, a domain, a geographical location, a multicast, and a unicast.

6. The method of claim 5, wherein the identifying contexts of the plurality of URIs further comprises:
    selecting, based on the contexts, a group of URIs from the plurality of URIs;
    ranking the group of URIs higher than an unselected group of URIs in the plurality of URIs; and
    determining, based on the ranking, a context ranking for the plurality of URIs.

7. The method of claim 6, wherein the group of URIs is selected based on the logical domain.

8. The method of claim 6, wherein the group of URIs is selected based on the resource type.

9. The method of claim 6, wherein the group of URIs is selected based on the geographical location.

10. The method of claim 6, wherein the group of URIs is selected based on the multicast group.

11. The method of claim 1, wherein the search query comprises a resource type, a domain, a range of ranks, and a sleeping status indicator.

12. The method of claim 1, wherein the real-time ranking of the plurality of URIs is determined based on checking a sleep status for each of the plurality of servers.

13. The method of claim 12, wherein the checking a sleep status for each of the plurality of servers further comprises:
    comparing the sleep status for the each of the plurality of URIs with a sleep schedule received from the plurality of servers; and
    determining, based on the comparing the sleep status, a sleep status ranking for the plurality of URIs.

14. The method of claim 13, wherein the determining the sleep status ranking further comprises:
if a URI in the plurality of URIs is asleep, ranking the URI lower than an another URI in the plurality of URIs that is awake.

15. The method of claim 13, wherein the determining the sleep status ranking further comprises:
if a URI in the plurality of URIs is asleep, removing the URI in the ranked list.

16. The method of claim 1, wherein the real-time ranking of the plurality of URIs are determined based on partially balancing traffic loads of the plurality of servers.

17. The method of claim 16, wherein the partially balancing traffic loads of the plurality of servers further comprises:
determining a first URI in the plurality of URIs that has been ranked higher a predetermined number of times than a second URI in the plurality of URIs;
ranking the first URI lower than the second URI; and
generating, based on the ranking, a quasi-load balancing ranking for the plurality of URIs.

18. The method of claim 16, wherein the partially balancing traffic loads of the plurality of servers further comprises:
determining a first URI in the plurality of URIs that has been detected with higher traffic loads than a second URI in the plurality of URIs;
ranking the first URI lower than the second URI; and
generating, based on the ranking, a quasi-load balancing ranking for the plurality of URIs.

19. A system in an Internet of Things (IoT) network comprising a plurality of IoT servers and a resource directory, the system comprising:
a processor; and
memory, coupled to the processor, the memory comprising executable instructions that when executed by the processor cause the processor to effectuate operations comprising:
registering a plurality of uniform resource identifiers (URIs) received from the plurality of IoT servers;
determining an initial ranking for the plurality of URIs based on measuring cross-links between each of the plurality of URIs;
generating a ranked database based on the initial ranking;
receiving a search query from a client entity;
determining, based on the search query, a real-time ranking of the plurality of URIs in the ranked database;
generating, based on the real-time ranking, a ranked list of the plurality of URIs; and
providing the ranked list of the plurality of URIs to the client entity,
wherein the real-time ranking of the plurality of URIs is determined based on checking sleep status of each of the plurality of IoT servers.

* * * * *